United States Patent
Pourahmadi et al.

(10) Patent No.: US 10,555,319 B2
(45) Date of Patent: Feb. 4, 2020

(54) INTERFERENCE MEASUREMENT METHODS FOR ADVANCED RECEIVER IN LTE/LTE-A

(71) Applicant: BlackBerry Limited, Waterloo (CA)

(72) Inventors: Vahid Pourahmadi, Ottawa (CA); Hua Xu, Ottawa (CA); Siva Dharshan Muruganathan, Stittsville (CA); Yongkang Jia, Ottawa (CA); Shiwei Gao, Nepean (CA); Yi Song, Plano, TX (US); Robert Mark Harrison, Grapevine, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/049,226

(22) Filed: Jul. 30, 2018

(65) Prior Publication Data

US 2019/0029025 A1 Jan. 24, 2019

Related U.S. Application Data

(63) Continuation of application No. 15/208,168, filed on Jul. 12, 2016, now Pat. No. 10,064,200, which is a
(Continued)

(51) Int. Cl.
*H04W 72/08* (2009.01)
*H04L 5/00* (2006.01)
(Continued)

(52) U.S. Cl.
CPC ........... *H04W 72/082* (2013.01); *H04J 11/00* (2013.01); *H04L 5/0007* (2013.01);
(Continued)

(58) Field of Classification Search
CPC .. H04W 72/082; H04L 5/0053; H04L 5/0094; H04L 27/26; H04L 5/0073; H04L 5/0007; H04L 5/0051; H04J 11/00
See application file for complete search history.

(56) References Cited

U.S. PATENT DOCUMENTS 8,509,836 B2  8/2013  Shin et al.
8,693,971 B1  4/2014  Balraj et al.
(Continued)

FOREIGN PATENT DOCUMENTS

CN  101291515 A  10/2008
CN  101300757 A  11/2008
(Continued)

OTHER PUBLICATIONS

Yue, Jiang, et al.; "Channel Estimation and Data Detection for MIMO-OFDM Systems"; IEEE Globecom; 2003; 5 pages.
(Continued)

*Primary Examiner* — Shailendra Kumar
(74) *Attorney, Agent, or Firm* — Robert Rose. P.C.; J. Robert Brown, Jr.; Albert A. Abbou

(57) ABSTRACT

A method for receiving a PDCH is provided. The method includes receiving, by a UE, information identifying a plurality of resource elements that are transmitted with zero power in a resource block containing the PDCH; receiving, by the UE, a first DMRS on a first DMRS port transmitted from a first cell; and receiving, by the UE, the PDCH that is transmitted on the first DMRS port.

20 Claims, 13 Drawing Sheets

Related U.S. Application Data continuation of application No. 13/773,413, filed on Feb. 21, 2013, now Pat. No. 9,425,946.

(51) Int. Cl.
  *H04L 27/26* (2006.01)
  *H04J 11/00* (2006.01)

(52) U.S. Cl.
  CPC .......... *H04L 5/0051* (2013.01); *H04L 5/0053* (2013.01); *H04L 5/0073* (2013.01); *H04L 5/0094* (2013.01); *H04L 27/26* (2013.01)

(56) References Cited

U.S. PATENT DOCUMENTS

| | | |
|---|---|---|
| 8,902,842 B1 | 12/2014 | Gomadam et al. |
| 8,923,207 B2 | 12/2014 | Ho |
| 8,989,755 B2 | 3/2015 | Muruganathan et al. |
| 9,369,253 B2 | 6/2016 | Pourahmadi et al. |
| 9,425,946 B2 | 8/2016 | Pourahmadi et al. |
| 9,825,741 B2 | 11/2017 | Tabet et al. |
| 10,064,200 B2 | 8/2018 | Pourahmadi et al. |
| 2008/0108363 A1 | 5/2008 | Yu et al. |
| 2010/0260059 A1 | 10/2010 | Zhang et al. |
| 2010/0267408 A1 | 10/2010 | Lee et al. |
| 2011/0009137 A1 | 1/2011 | Chung et al. |
| 2011/0038310 A1 | 2/2011 | Chmiel et al. |
| 2011/0176499 A1 | 7/2011 | Siomina et al. |
| 2011/0268046 A1 | 11/2011 | Choi et al. |
| 2012/0082052 A1 | 4/2012 | Oteri et al. |
| 2012/0113843 A1* | 5/2012 | Watfa ................ H04W 72/1289 370/252 |
| 2012/0202540 A1 | 8/2012 | Lee et al. |
| 2012/0202558 A1 | 8/2012 | Hedberg et al. |
| 2012/0213261 A1 | 8/2012 | Sayana et al. |
| 2012/0281683 A1 | 11/2012 | Falconetti et al. |
| 2013/0100901 A1* | 4/2013 | Shan ..................... H04L 5/0048 370/329 |
| 2013/0114438 A1 | 5/2013 | Bhattad et al. |
| 2013/0121276 A1 | 5/2013 | Kim et al. |
| 2013/0208604 A1 | 8/2013 | Lee et al. |
| 2013/0287064 A1* | 10/2013 | Seo ......................... H04J 13/18 375/144 |
| 2013/0308488 A1* | 11/2013 | Tong ..................... H04B 7/0452 370/252 |
| 2013/0315157 A1 | 11/2013 | Krishnamurthy et al. |
| 2014/0036747 A1 | 2/2014 | Nory et al. |
| 2014/0044057 A1* | 2/2014 | Gaal ................... H04W 72/042 370/329 |
| 2014/0092827 A1 | 4/2014 | Jongren et al. |
| 2014/0126402 A1 | 5/2014 | Nam et al. |
| 2014/0126496 A1 | 5/2014 | Sayana et al. |
| 2014/0185530 A1 | 7/2014 | Kuchibhotla et al. |
| 2014/0187283 A1 | 7/2014 | Nimbalker et al. |
| 2014/0321313 A1 | 10/2014 | Seo et al. |
| 2014/0369293 A1 | 12/2014 | Guo et al. |
| 2015/0036607 A1 | 2/2015 | Park et al. |
| 2015/0139141 A1 | 5/2015 | Seo et al. |
| 2016/0323895 A1 | 11/2016 | Pourahmadi et al. |

FOREIGN PATENT DOCUMENTS

| | | |
|---|---|---|
| CN | 101924610 A | 12/2010 |
| CN | 102065465 A | 5/2011 |
| CN | 102158302 A | 8/2011 |
| CN | 102271109 A | 12/2011 |
| CN | 102714866 A | 10/2012 |
| CN | 102781098 A | 11/2012 |
| CN | 102792600 A | 11/2012 |
| KR | 20110040711 A | 4/2011 |
| WO | 2011115421 A3 | 9/2011 |
| WO | 2012096476 A2 | 7/2012 |
| WO | WO 2012/096476 A2 * | 7/2012 |
| WO | 2012108802 A1 | 8/2012 |

OTHER PUBLICATIONS

Kim, J.W., et al.; "Noise Subspace Approach for Interference Cancellation"; IEEE Electronics Letters; Issue 11, vol. 25; May 25, 1989; 2 pages.

ETSI TS 136 214 V9.1.0; LTE; Evolved Universal Terrestrial Radio Access (E-UTRA); Physical Layer-Measurements (3GPP TS 36.214 V9.1.0; Release 9); Apr. 2010; 15 pages.

ETSI TS 136 213 V9.1.0; LTE; Evolved Universal Terrestrial Radio Access (E-UTRA); Physical Layer Procedures (3GPP TS 36.213 V9.1.0; Release 9); Apr. 2010; 81 pages.

ETSI TS 136 133 V9.3.0; LTE; Evolved Universal Terrestrial Radio Access (E-UTRA); Requirements for Support of Radio Resource Management (3GPP TS 36.133 V9.3.0; Release 9); Apr. 2010; 180 pages. (Part 1).

ETSI TS 136 133 V9.3.0; LTE; Evolved Universal Terrestrial Radio Access (E-UTRA); Requirements for Support of Radio Resource Management (3GPP TS 36.133 V9.3.0; Release 9); Apr. 2010; 183 pages. (Part 2).

3GPP TSG-RAN WG1 Meeting #65; "Coordinated Transmission in Support of Interference Aware Receivers"; R1-111561; Barcelona, Spain; May 9-13, 2011; 7 pages.

3GPP TSG RAN WG1 Meeting #66; "CRS Interference Cancellation in HetNet Scenarios for UE Performance Requirements"; R1-112507; Athens, Greece; Aug. 22-26, 2011; 3 pages.

3GPP TSG-RAN WG1 Meeting #66; "Analysis of CRS and PDSCH Collisions in Scenarios 3 and 4"; R1-112226; Athens, Greece; Aug. 22-26, 2011; 6 pages.

3GPP TSG RAN WG1 Meeting #66; "Handling the Legacy Transmission in ABS"; R1-112332; Athens, Greece; Aug. 22-26, 2011; 4 pages.

3GPP TSG RAN WG1 Meeting #66; "Considerations on Interference Measurement and Its Specification"; R1-112110; Athens, Greece; Aug. 22-26, 2011; 5 pages.

3GPP TS 36.331 V9.4.0; 3rd Generation Partnership Project; Technical Specification Group Radio Access Network; Evolved Universal Terrestrial Radio Access (E-UTRA); Radio Resource Control (RRC); Protocol Specification; Release 9; Sep. 2010; 252 pages.

3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.

3GPP TR 36.819 V11.1.0; 3rd Generation Partnership Project; Technical Specification Group Radio Access Network; Coordinated Multi-Point Operation for LTE Physical Layer Aspects; Release 11; Dec. 2011; 69 pages.

3GPP TS 36.213 V11.0.0; 3rd Generation Partnership Project; Technical Specification Group Radio Access Network; Evolved Universal Terrestrial Radio Access (E-UTRA); Physical Layer Procedures; Release 11; Sep. 2012; 143 pages.

3GPP TS 36.300 V11.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Sep. 2012; 205 pages.

3GPP TR 36.829 V11.0.0; 3rd Generation Partnership Project; Technical Specification Group Radio Access Network; Enhanced Performance Requirement for LTE User Equipment (UE); Release 11; Mar. 2012; 83 pages.

3GPP TS 36.211 V10.5.0; 3rd Generation Partnership Project; Technical Specification Group Radio Access Network; Evolved Universal Terrestrial Radio Access (E-UTRA); Physical Channels and Modulation; Release 10; Jun. 2012; 101 pages.

3GPP TS 36.423 V11.2.0; 3rd Generation Partnership Project; Technical Specification Group Radio Access Network; Evolved Universal Terrestrial Radio Access (E-UTRA); X2 Application Protocol (X2AP); Release 11; Sep. 2012; 136 pages.

Dahlman, Erik, et al.; "4G LTE/LTE-Advanced for Mobile Broadband"; Mar. 29, 2011; 61 pages.

3GPP TSG RAN WG1 Meeting #68bis; "UE-Specific DM-RS Configuration"; R1-121093; Jeju, Korea; Mar. 26-30, 2012; 4 pages.

(56) References Cited

OTHER PUBLICATIONS

3GPP TSG RAN WG1 Meeting #70bis; "Association Between DM-RS Ports and EPDCCH Transmission"; R1-124242; San Diego, USA; Oct. 8-12, 2012; 4 pages.
3GPP TSG RAN WG1 Meeting #65; "Discussions on DL Control Signaling Enhancment"; R1-111789; Barcelona, Spain; May 9-13, 2011; 3 pages.
Xincheng, Zhang, et al.; "Reference Signal Design"; Excerpt from "LTE-Advanced Air Interface Technology"; CRC Press; Sep. 12, 2012; 29 pages.
Zhang, Xincheng, et al.; "LTE-Advanced Air Interface Technology"; CRC Press; Sep. 2012; 47 pages.
3GPP TSG-RAN WG1 LTE Ad Hoc Meeting; "Combining Inter-cell-interference Co-ordination/avoidance with Cancellation in Downlink and TP"; R1-060200; Helsinki, Finland; Jan. 23-25, 2006; 3 pages.
Ohwatari, Yusuke, et al.; "Performance of Advanced Receiver Employing Interference Rejection Combining to Suppress Inter-cell Interference in LTE-Advanced Downlink"; IEEE; 2011; 7 pages.
3GPP TSG TAN WG1 #66bis; "Interference Measurement for Downlink CoMP"; R1-113091; Zhuhai, China; Oct. 10-14, 2011; 4 pages.
3GPP TSG RAN WG1 Meeting #64; "On Advanced UE MMSE Receiver Modelling in System Simulations"; R1-111031; Taipei, Taiwan; Feb. 21-25, 2011; 10 pages.
3GPP TSG RAN WG1 Meeting #63bis; "Interference Measurement Over Muted RE"; R1-110049; Dublin, Ireland; Jan. 17-21, 2011; 4 pages.
3GPP TSG RAN WG1 Meeting #61 bis; "Possibility of UE Side ICI Cancellation in Hetnet"; R1-103778; Dresden, Germany; Jun. 28-Jul. 2, 2010; 2 pages.
Thiele, Lars, et al.; "Interference Management for Future Cellular OFDMA Systems Using Coordinated Multi-Point Transmission"; IEICE Transactions of Communications; Dec. 2010; 10 pages.
Ruuska, Paivi, et al.; "Implementation Aspects of a 802.19.1 Coexistence System"; IEEE 802.19-10/0165r1; Nov. 10, 2010; 25 pages.
3GPP TSG RAN WG1 #63bis; "Discussion on Transmission Mode for PUCCH Format 3"; R1-110391; Dublin, Ireland; Jan. 17-21, 2011; 3 pages.
3GPP TSG RAN WG1 Meeting #70bis; "Association Between DM-RS Ports and EPDCCH Transmission"; R1-124187; San Diego, USA; Oct. 8-12, 2012; 5 pages.
Office Action dated Oct. 3, 2013; U.S. Appl. No. 13/360,399, filed Jan. 27, 2012; 26 pages. (4214-35201).
Final Office Action dated May 14, 2014; U.S. Appl. No. 13/360,399, filed Jan. 27, 2012; 18 pages. (4214-35201).
Office Action dated Mar. 12, 2015; U.S. Appl. No. 13/360,399, filed Jan. 27, 2012; 27 pages. (4214-35201).
Final Office Action dated Sep. 24, 2015; U.S. Appl. No. 13/360,399, filed Jan. 27, 2012; 19 pages. (4214-35201).
Office Action dated Jan. 25, 2016; U.S. Appl. No. 13/360,399, filed Jan. 27, 2012; 13 pages. (4214-35201).
Final Office Action dated Sep. 9, 2016; U.S. Appl. No. 13/360,399, filed Jan. 27, 2012; 20 pages. (4214-35201).
Advisory Action dated Dec. 1, 2016; U.S. Appl. No. 13/360,399, filed Jan. 27, 2012; 4 pages. (4214-35201).
Office Action dated Jan. 3, 2017; U.S. Appl. No. 13/360,399, filed Jan. 27, 2012; 13 pages. (4214-35201).
Notice of Allowance dated Jul. 14, 2017; U.S. Appl. No. 13/360,399, filed Jan. 27, 2012; 12 pages. (4214-35201).
Office Action dated Aug. 1, 2014; U.S. Appl. No. 13/773,408, filed Feb. 21, 2013; 39 pages. (4214-39900).
Final Office Action dated Jan. 12, 2015; U.S. Appl. No. 13/773,408, filed Feb. 21, 2013; 33 pages. (4214-39900).
Advisory Action dated Mar. 12, 2015; U.S. Appl. No. 13/773,408, filed Feb. 21, 2013; 3 pages. (4214-39900).
Office Action dated Jun. 4, 2015; U.S. Appl. No. 13/773,408, filed Feb. 21, 2013; 32 pages. (4214-39900).
Office Action dated Oct. 23, 2015; U.S. Appl. No. 13/773,408, filed Feb. 21, 2013; 37 pages. (4214-39900).
Notice of Allowance dated Apr. 8, 2016; U.S. Appl. No. 13/773,408, filed Feb. 21, 2013; 15 pages. (4214-39900).
Office Action dated Jul. 16, 2014; U.S. Appl. No. 13/777,794, filed Feb. 26, 2013; 23 pages. (4214-40000).
Final Office Action dated Oct. 20, 2014; U.S. Appl. No. 13/777,794, filed Feb. 26, 2013; 7 pages. (4214-40000).
Advisory Action dated Dec. 9, 2014; U.S. Appl. No. 13/777,794, filed Feb. 26, 2013; 7 pages. (4214-40000).
Notice of Allowance dated Jan. 23, 2015; U.S. Appl. No. 13/777,794, filed Feb. 26, 2013; 26 pages. (4214-40000).
Office Action dated Aug. 1, 2014; U.S. Appl. No. 13/773,413, filed Feb. 21, 2013; 36 pages. (4214-40500).
Final Office Action dated Jan. 12, 2015; U.S. Appl. No. 13/773,413, filed Feb. 21, 2013; 32 pages. (4214-40500).
Advisory Action dated Mar. 16, 2015; U.S. Appl. No. 13/773,413, filed Feb. 21, 2013; 3 pages. (4214-40500).
Office Action dated Jun. 10, 2015; U.S. Appl. No. 13/773,413, filed Feb. 21, 2013; 26 pages. (4214-40500).
Final Office Action dated Oct. 20, 2015; U.S. Appl. No. 13/773,413, filed Feb. 21, 2013; 37 pages. (4214-40500).
Office Action dated Jan. 15, 2016; U.S. Appl. No. 13/773,413, filed Feb. 21, 2013; 21 pages. (4214-40500).
Notice of Allowance dated Apr. 18, 2016; U.S. Appl. No. 13/773,413, filed Feb. 21, 2013; 15 pages. (4214-40500).
Office Action dated Jun. 16, 2017; U.S. Appl. No. 15/208,168, filed Jul. 12, 2016; 47 pages. (4214-40504).
Office Action dated Nov. 28, 2017; U.S. Appl. No. 15/208,168, filed Jul. 12, 2016; 25 pages. (4214-40504).
Notice of Allowance dated May 25, 2018; U.S. Appl. No. 15/208,168, filed Jul. 12, 2016; 22 pages. (4214-40504).
PCT International Search Report; Application No. PCT/US2012/022977; dated Sep. 27, 2012; 3 pages. (4214-35202).
PCT Written Opinion of the International Searching Authority; Application No. PCT/US2012/022977; dated Sep. 27, 2012; 6 pages. (4214-35202).
PCT International Partial Search Report; Application No. PCT/US2013/071514; dated Mar. 7, 2014; 6 pages. (4214-39901).
PCT International Search Report; Application No. PCT/US2013/071514; dated Jun. 5, 2014; 6 pages. (4214-39901).
PCT Written Opinion of the International Searching Authority; Application No. PCT/US2013/071514; dated Jun. 5, 2014; 9 pages. (4214-39901).
Chinese Office Action; Application No. 201380075851.6; dated Aug. 2, 2017; 26 pages. (4214-39902).
PCT International Search Report; Application No. PCT/US2014/015839; Apr. 28, 2014; 4 pages. (4214-40001).
PCT Written Opinion of the International Searching Authority; Application No. PCT/US2014/015839; dated Apr. 28, 2014; 7 pages. (4214-40001).
Canadian Office Action; Application No. 2,902,445; dated Oct. 21, 2016; 5 pages. (4214-40002).
Canadian Office Action; Application No. 2,902,445; dated Aug. 31, 2017; 4 pages. (4214-40002).
Chinese Office Action; Application No. 201480023667.1; dated Jan. 19, 2018; 12 pages. (4214-40003).
European Examination Report; Application No. 14707547.7; dated Apr. 5, 2017; 6 pages. (4214-40004).
PCT International Search Report; Application No. PCT/US2013/071672; dated Apr. 2, 2014; 3 pages. (4214-40501).
PCT Written Opinion of the International Searching Authority; Application No. PCT/US2013/071672; dated Apr. 2, 2014; 8 pages. (4214-40501).
Chinese Office Action; Application No. 201380075826.8; dated Jun. 19, 2017; 15 pages. (4214-40502).
European Partial Search Report; Application No. 12837777.7; dated Feb. 20, 2015; 8 pages.
European Extended Search Report; Application No. 12837777.7; dated Mar. 30, 2015; 16 pages.
European Examination Report; Application No. 12837777.7; dated Apr. 1, 2016; 5 pages.
Korean Office Action; Application No. 10-2014-7012259; dated Jul. 7, 2015; 9 pages.

(56) References Cited

OTHER PUBLICATIONS

Chinese Office Action; Application No. 201280049468.9; dated Feb. 29, 2016; 15 pages.
Chinese Office Action; Application No. 201280049468.9; dated Oct. 8, 2016; 8 pages.
Canadian Office Action; Application No. 2,849,070; dated Jun. 13, 2017; 3 pages.
3GPP TSG RAN WG1 Meeting #66bis; "DL Reference Signal Enhancement for CoMP Transmission"; Zhuhai, China; Oct. 10-14, 2011; 3 pages.
European Examination Report; Application No. 13803374.1; dated Sep. 24, 2019; 6 pages. (4214-39903).
3GPP TSG RAN WG1 Meeting #70bis; "DMRS Scrambling Sequence for ePDCCH"; R1-124273; San Diego, USA; Oct. 8-12, 2012; 2 pages.
European Extended Search Report; Application No. 19173352.6; dated Jul. 29, 2019; 9 pages. (4214-40511).

* cited by examiner

INTERFERENCE MEASUREMENT METHODS FOR ADVANCED RECEIVER IN LTE/LTE-A

CROSS REFERENCE TO RELATED APPLICATIONS

This application is a continuation of U.S. patent application Ser. No. 15/208,168 filed Jul. 12, 2016 by Vahid Pourahmadi, et al., entitled "Interference Measurement Methods for Advanced Receiver in LTE-LTE/A", which is a continuation of U.S. Pat. No. 9,425,946 issued on Aug. 23, 2016 entitled, "Interference Measurement Methods for Advanced Receiver in LTE-LTE/A", both of which are incorporated by reference herein as if reproduced in their entirety.

FIELD OF THE DISCLOSURE

The present disclosure relates to interference measurement in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or a network element.

Herein, eNB antennas serving a cell are presumed to be collocated. Cooperative multipoint transmission (CoMP) may be used between different non-collocated cells, including those that have the same Cell ID. Any set of cells that includes one or more cells with a smaller coverage area than the typical coverage area of a traditional eNB may be referred to herein as a small cell deployment. A cell with the relatively large coverage area provided by a traditional eNB may be referred to herein as a macro cell. A cell with a relatively smaller coverage area than a macro cell may be referred to herein as a small cell, a pico cell, or a femto cell. Alternatively or additionally, a macro cell may be considered a high power cell, and a small cell may be considered a low power cell. The access node in a macro cell may be referred to as a macro eNB or a macro node, and the access node in a small cell may be referred to as a small cell eNB, a pico eNB or a femto eNB.

LTE may be said to correspond to Third Generation Partnership Project (3GPP) Release 8 (Rel-8), Release 9 (Rel-9), and Release 10 (Rel-10), and possibly also to releases beyond Release 10, while LTE Advanced (LTE-A) may be said to correspond to Release 10, Release 11 (Rel-11), and possibly also to releases beyond Release 10 and Release 11. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Embodiments of the present disclosure provide systems and methods for interference measurement in small cell deployments. To aid in the description of the embodiments, some background information will first be provided regarding LTE subframes, small cells and macro cells, coordinated multipoint schemes, relative narrowband transmit power indications, almost blank subframes, advanced receivers, and inter-cell interference.

Figure 1:
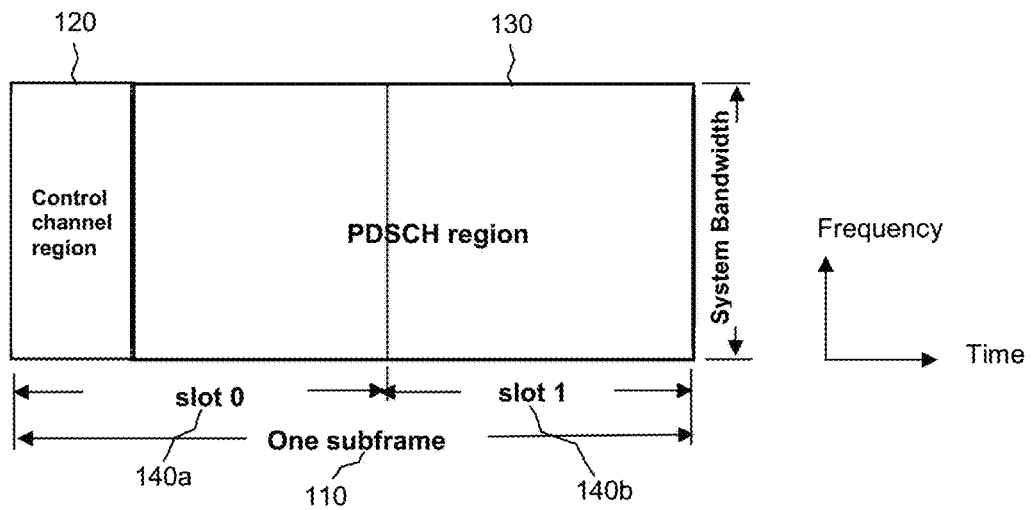
FIG. 1 is a diagram of a downlink LTE subframe according to the prior art.

FIG. 1 illustrates a typical downlink (DL) LTE subframe 110. Control information such as the physical downlink control channel (PDCCH), the physical control format indicator channel (PCFICH), and the physical HARQ (hybrid automatic repeat request) indicator channel (PHICH) are transmitted in a control channel region 120. The control channel region 120 includes the first few OFDM (orthogonal frequency division multiplexing) symbols in the subframe 110. The exact number of OFDM symbols for the control channel region 120 is either dynamically indicated by the PCFICH, which is transmitted in the first symbol, or semi-statically configured when cross carrier scheduling is configured in the case of carrier aggregation in LTE Rel-10.

The PDSCH (physical downlink shared channel), PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals are transmitted over both the control channel region 120 and the PDSCH region 130.

Each subframe 110 can include a number of OFDM symbols in the time domain and a number of subcarriers in the frequency domain. An OFDM symbol in time and a subcarrier in frequency together define a resource element (RE). A physical resource block (RB or PRB) can be defined as, for example, 12 consecutive subcarriers in the frequency domain and all the OFDM symbols in a slot in the time domain. An RB pair with the same RB index in slot 0 (140a) and slot 1 (140b) in a subframe can be allocated together.

Figure 2:
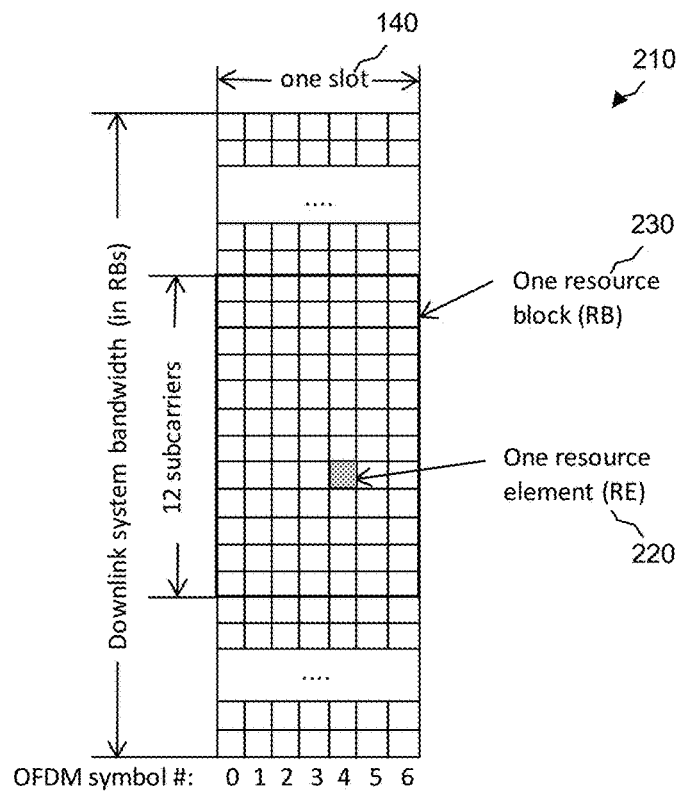
FIG. 2 is a diagram of an LTE downlink resource grid in the case of a normal cyclic prefix according to the prior art.

FIG. 2 shows an LTE DL resource grid 210 within each slot 140 in the case of a normal cyclic prefix (CP) configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure.

An RB 230 is the minimum unit used for the mapping of certain physical channels to REs 220.

Figure 3:
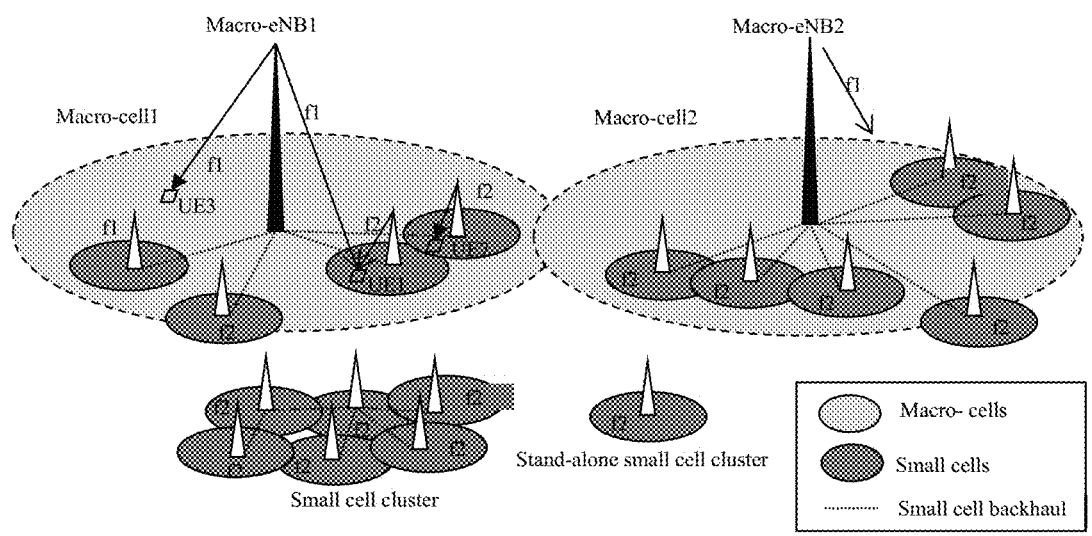
FIG. 3 is a diagram of deployment scenarios of small cells with and without macro coverage according to the prior art.

Dense small cell deployments have been suggested as a technique to meet the explosive growth in demand for capacity in wireless telecommunications systems. Small cells using low-power nodes are considered promising in this regard, especially for hotspot area deployments in indoor and outdoor scenarios. A low-power node generally means a node whose transmission power is lower than that of a macro node. Some possible small cell deployment scenarios of interest are shown in FIG. 3. In one scenario, one or more small cells may operate at the same frequency as one or more overlaying macro cells. In another scenario, one or more small cells may operate on an entirely different frequency band from one or more overlaying macro cells. Because groups or clusters of cells may operate on different frequency bands, cells that operate on the same carrier frequency may be said to operate on a layer. For instance, a macro layer may operate on a low frequency band such as 700 megahertz (MHz), and a small cell layer may operate on a high frequency band such as 3.5 gigahertz (GHz). One of the advantages of such a deployment scenario is that interference between a small cell and the macro cell may be avoided. Another advantage is that when a UE is under the coverage of both a small cell and a macro cell, the UE may be served by both cells simultaneously. Using this multi-connectivity approach enables the UE to receive control plane information from the overlaying macro cell and user plane data communications from one or more small cells. In another scenario, a cluster of small cells may be operated on a given frequency band and may be deployed outside the coverage area of an overlaying macro cell.

In all of these scenarios, a communication link typically exists between a small cell eNB and an overlaying macro eNB or between two small cell eNBs. While the X2 interface can refer to a logical interface used to communicate network control information between eNBs, as used herein, the terms "X2 interface", "backhaul link", or "backhaul" may refer to an interface between any access nodes that is used for the purpose of exchanging network control information. The physical backhaul link between two eNBs may be a direct point-to-point connection or may be routed through another network.

Since a small cell deployment may have a high density of small cells and may be deployed with little planning, there may be a large amount of overlap among small cells. Such overlap may lead to strong inter-cell interference, which may degrade system performance. The interference mitigation techniques used in LTE Rel-11 and earlier releases mostly use transmitter coordination schemes to avoid generating interference at a UE receiver. On the other hand, when a UE receiver is equipped with multiple receiving antennas, the receiver may use an advanced receiver algorithm to suppress or cancel interference. As used herein, interference suppression may refer to improving the probability that a desired transmission is decoded correctly in the presence of interference, such as through the use of multi-antenna processing in the receiver. Interference suppression techniques do not necessarily estimate the channel that the interference passes through. Interference cancellation as used herein may also refer to techniques that improve desired transmission decoding probabilities in the presence of interference. However, such cancellation techniques may also include estimation of the channel that the interference passes through as well as the interference as received at the UE. Interference suppression and cancellation techniques may be used in combination. Therefore, using either or both of interference suppression and cancellation in a UE may be referred to as interference mitigation. As the desired signal and the interference signal generally do not come from same direction, an advanced receiver, for example a minimal mean square error interference rejection combining (MMSE-IRC) receiver, may use the channel state information of the desired channel and the interfering channel to suppress interference in the spatial domain. To perform interference cancellation, a receiver, for example a successive interference cancellation (SIC) receiver, may estimate the interfering signals and remove the interfering signals from the received signal. Thus, after interference cancellation, desired signal detection performance may be improved.

Figure 4:
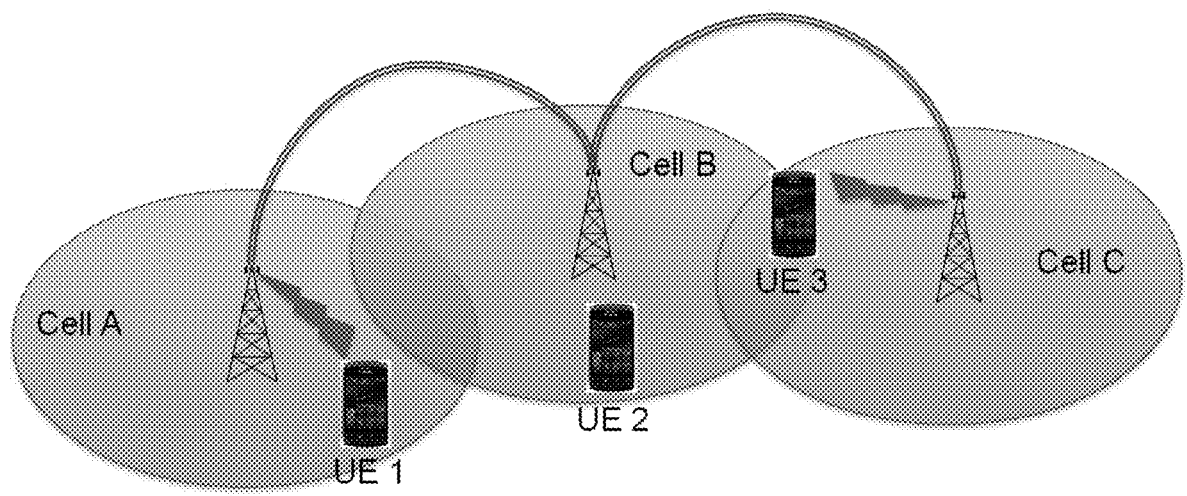
FIG. 4 is a diagram of an example of coordinated scheduling according to the prior art.

Various forms of downlink coordinated multipoint (CoMP) transmission schemes have been previously considered with the aim of improving cell edge user performance. One form of downlink CoMP, referred to as coordinated scheduling (CS), is illustrated in FIG. 4. In the example shown in FIG. 4, neighboring cells labeled A, B, and C coordinate their respective scheduling such that cell B either reduces its transmission power or avoids scheduling UE 2 (which is assumed to be served by Cell B) on a given set of time-frequency resources to reduce the interference to neighboring cell UEs 1 and 3. This allows cell edge UEs 1 and 3 to be served by their respective Cells A and C on the given set of time-frequency resources (i.e., the resources in which Cell B reduces its transmission power or avoids scheduling UE 2). In general, CS schemes assume that data for a given UE is only available at and transmitted from one cell. It may be noted, however, that CS involves dynamic coordination among multiple cells, which may require the backhaul link interconnecting the cells participating in CS to have low latency on the order of a few milliseconds.

Figure 5:
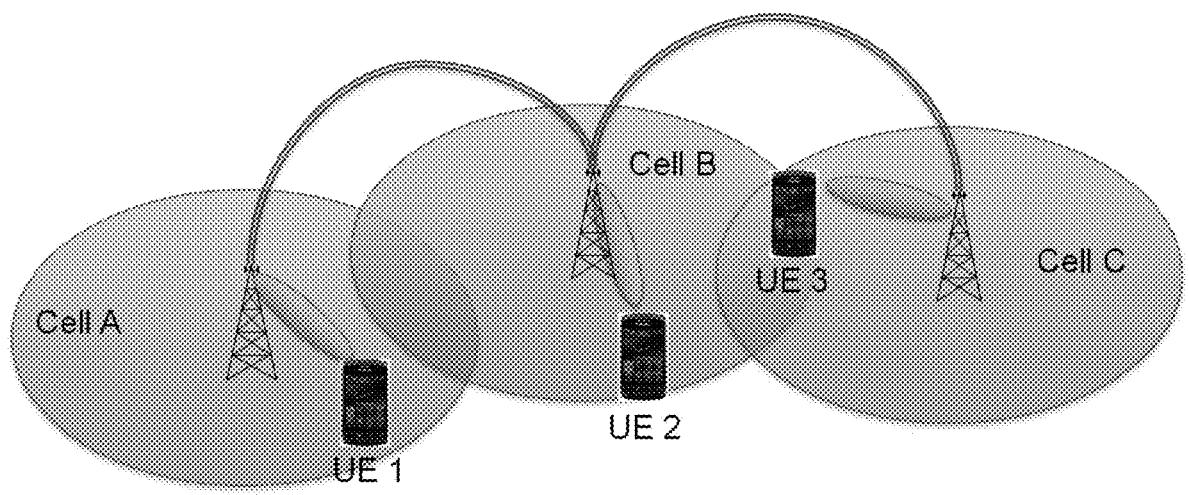
FIG. 5 is a diagram of an example of coordinated beamforming according to the prior art.

Coordinated beamforming (CB) is another form of downlink CoMP, an example of which is shown in FIG. 5. In CB, interfering cells are allowed to transmit to their cell edge UEs on a given set of time-frequency resources as long as the transmission beam to a given UE is chosen so as to minimize the interference to adjacent cell UEs. In the example shown in FIG. 5, neighboring cells labeled A, B, and C coordinate their beamforming vectors such that their respective UEs 1, 2, and 3 can be served simultaneously on a given set of time-frequency resources. Similar to CS schemes, CB also assumes that data for a given UE is only available at and transmitted from one cell. This scheme may require the UEs to feed back not only the channel state information (CSI) of their serving cell, but the CSI of other eNBs in the CoMP set. Furthermore, CB schemes also require dynamic coordination among multiple cells, which may require the backhaul link interconnecting the cells participating in CB to have low latency.

Figure 6:
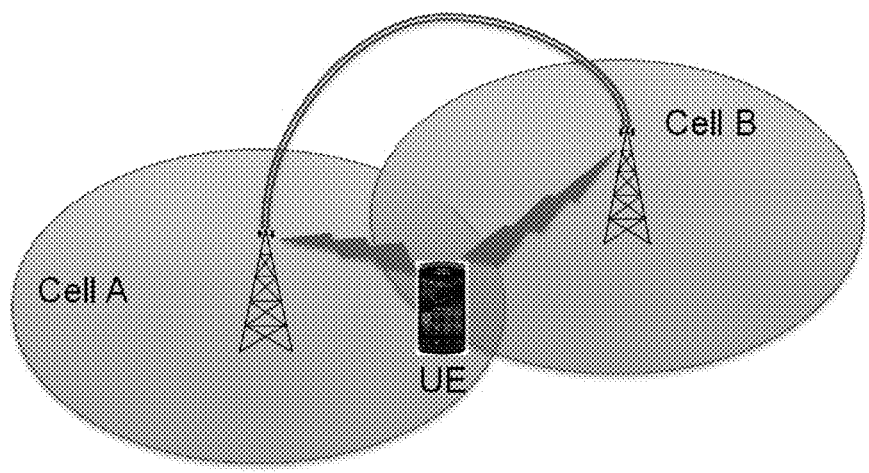
FIG. 6 is a diagram of an example of joint transmission according to the prior art.

A third form of downlink CoMP, known as joint transmission (JT), allows simultaneous transmission from multiple cells to one or more UEs in a given set of time-frequency resources. A simple example of JT is illustrated in FIG. 6. In this example, both cells A and B jointly transmit data to the UE. JT schemes generally require the backhaul link between the cells participating in joint transmission to have low latency. Additionally, the backhaul link may also need to have a high bandwidth, because JT involves data sharing between different cells.

It may be noted that when the downlink CoMP cooperating set involves multiple cells, it is possible to combine the CS/CB and JT schemes to form a hybrid downlink CoMP transmission.

Figure 7:
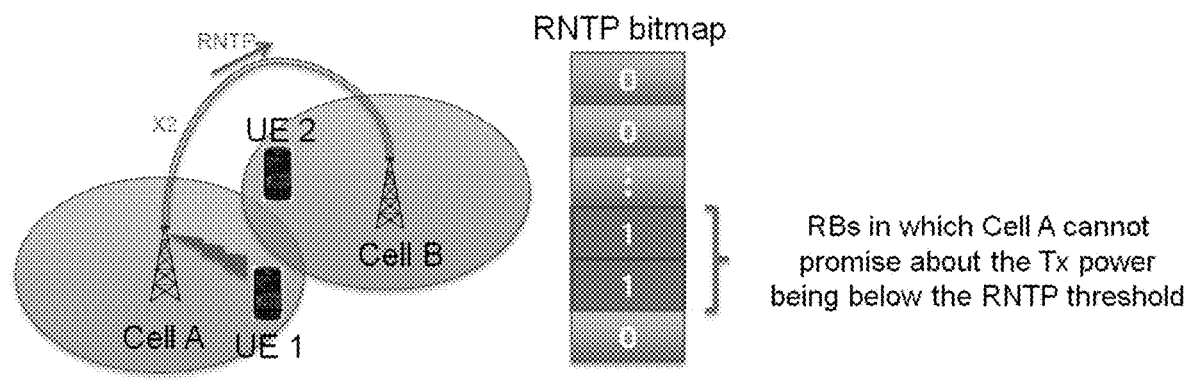
FIG. 7 is a diagram of an example of RNTP indication to adjacent cells according to the prior art.

The downlink CoMP schemes rely on dynamic coordination among the participating cells. In contrast, a scheme known as relative narrowband transmit power (RNTP), which uses a semi-statically exchanged bitmap, was introduced in LTE Release 8/9 to facilitate downlink frequency-domain inter-cell interference coordination (ICIC). As shown in FIG. 7, the RNTP bitmap is exchanged between neighboring cells over the X2 interface. Each bit in the RNTP bitmap represents a resource block (RB) and is used to inform the neighboring cell whether or not the transmit power on that RB is below a certain threshold. For instance in FIG. 7, cell A may transmit on high power to UE 1 on certain RBs. It is assumed that the high transmit power, once normalized by the maximum output power of cell A, may exceed the upper limit threshold. These RBs are indicated with a value of '1' on the RNTP bitmap, which means that cell A can make 'no promise' about the transmission power being below the RNTP threshold on these RBs. Then, the resulting RNTP bitmap is transmitted to cell B via the X2 interface. On receiving the RNTP bitmap, cell B may avoid scheduling UE 2, which is at the cell-edge of cell B, in those RBs where cell A is indicating an RNTP value of 1. However, to allow some scheduling flexibility, the reaction of the receiving cell to an RNTP indication is not standardized. It may be noted that LTE allows the value of the power threshold and the time period over which a given RNTP indication is valid to be configurable. The RNTP indication-based ICIC scheme is focused toward avoiding interference and does not rely on the interference cancellation or suppression capabilities of advanced UE receivers.

Figure 8:
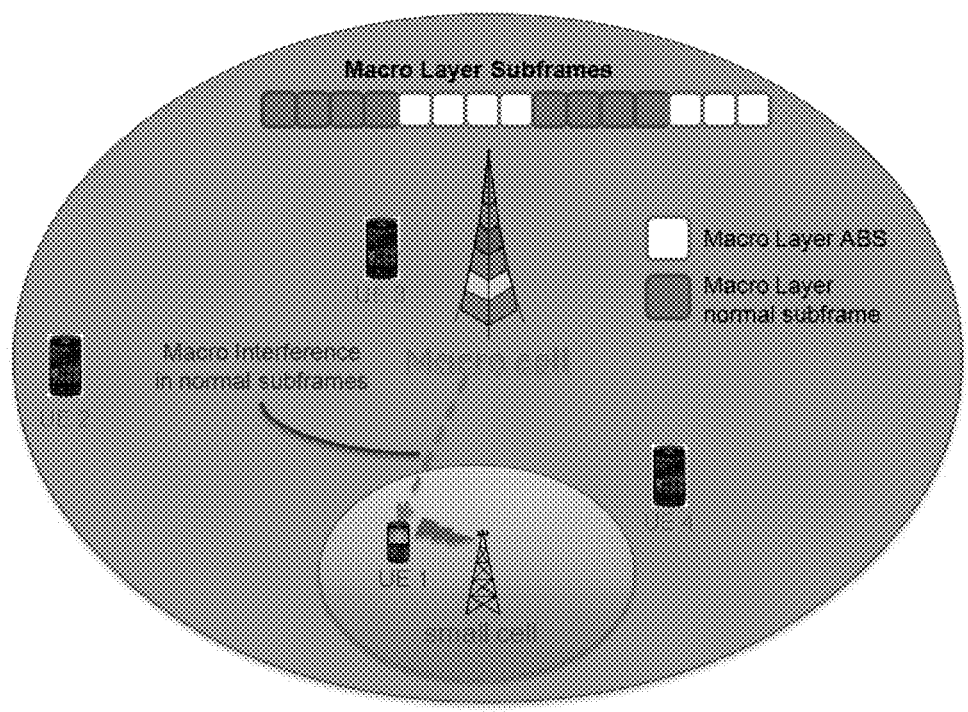
FIG. 8 is a diagram of an example of ABS-based eICIC according to the prior art.

The RNTP scheme enables ICIC in the frequency domain. With the deployment of co-channel heterogeneous networks, which consists of one or more small cells overlain within the coverage area of a macro cell, interference scenarios may arise that may require enhancements to the existing ICIC schemes. An example of an interference scenario between a macro cell and a small cell is illustrated in FIG. 8. In this scenario, the macro cell may cause interference to UE 1, which is assumed to be in cell range expansion (CRE) and served by the small cell. Particularly, the interference caused by the macro cell in normal subframes could significantly affect the control channel reception at UE 1. To circumvent this problem, time-domain based ICIC was introduced in LTE Release 10, which is also referred to as enhanced ICIC (eICIC). As part of eICIC, special subframes known as almost blank subframes (ABSs) were introduced. The ABSs are basically subframes where the macro cell reduces its transmission power or completely shuts off transmission, thus allowing the small cell the opportunity to schedule UE 1 during these special subframes. UE 1 may use a subset of the ABSs for radio resource measurements (RRM), radio link monitoring (RLM), and channel state information (CSI) measurements for the serving small cell and possibly for one or more neighboring small cells.

To ensure backward compatibility with Release 8/9 UEs, certain legacy signals or transmissions such as the primary synchronization signal (PSS), secondary synchronization signal (SSS), cell-specific reference signal (CRS), paging channel (PCH), and physical broadcast channel (PBCH) may need to be transmitted by the macro cell during an ABS. The ABS pattern may be configured by the macro cell and signaled to the small cell via the X2 interface. It may be noted that the ABS-based eICIC scheme is mainly applicable to scenarios where both the macro layer and the small cell layer operate on the same carrier frequency.

Neither CoMP, RNTP, nor ABS addresses the problem of joint inter-cell coordination and advanced interference cancellation or suppression described above. The downlink CoMP schemes may require the backhaul link interconnecting the coordinating cells to have low latency. However, in a heterogeneous scenario where one or more small cells are deployed with a high density in an area covered by an overlaying macro cell, the backhaul links interconnecting the small cells and the macro cell may involve notable latency. Hence, the downlink CoMP schemes may be unsuitable for a highly dense small cell scenario. The Release 8/9 downlink RNTP scheme is focused toward interference avoidance and does not rely on the interference cancellation or suppression capabilities of advanced receivers. The ABS-based eICIC solution introduced in Release 10 of the LTE specifications is primarily applicable to the case where both the macro layer and the small cell layer operate on the same carrier frequency. Hence, the ABS solution may not be directly applied to the case where the small cell layer operates on an entirely different frequency band from the overlapping macro cell.

As the receiver may obtain channel information more easily and accurately than the transmitter, using an advanced receiver to mitigate interference may have some advantages over schemes that rely on coordination purely between transmitters. For example, receiver-based interference mitigation may avoid complicated channel state information feedback corresponding to different transmission points involved in a typical pure coordinating approach. A significant improvement in link and system performance may be expected by using an advanced receiver to mitigate interference.

To suppress or cancel inter-cell interference by using an advanced receiver, some information about the interfering signal may need to be available to the receiver. For example, to employ an MMSE-IRC receiver, the received interference covariance matrix or the channel matrix from the interferers may need to be known to the receiver.

The MMSE-IRC type advanced receiver was studied in Release 11. That study assumed the utilization of an MMSE-IRC receiver on the UE side without any system (i.e., network) assistance. To enable interference suppression for an MMSE-IRC receiver, an interference covariance matrix may need to be estimated. Several interference covariance matrix estimation methods were proposed and studied in Release 11.

In one studied method, the UE first uses reference signals, e.g., the CRS or the demodulation reference signal (DMRS), from the serving cell to estimate the channel from that cell and then removes the serving cell reference signal portion from the received signal. The residual signal is used as an interference signal, which in turn is used to estimate the interference covariance matrix.

Another method studied involves using PDSCH data symbols to estimate the covariance matrix of the overall received signal. The received signal covariance matrix is then used in the MMSE-IRC receiver to suppress the interference. In this method, no interference covariance matrix is needed.

An MMSE-IRC receiver using either of the above-mentioned interference measurement methods has shown performance gain over an LTE baseline MMSE receiver, with the first mentioned method yielding superior performance compared to the second mentioned method. However, in these methods it was assumed that there was no assistance from the network to support accurate estimation of the interference and the desired channels. As a result, the MMSE-IRC receiver performance gain for the above methods was limited.

Some examples of advanced linear receivers with interference suppression capability will now be discussed.

In an OFDM multiple input/multiple output (MIMO) system, the signal model at one RE may be presented as:

$$x = Hs + \sum_{i=1}^{p} H_i s_i + n$$

where x is the received signal vector on the multiple receive antennas, s is the transmitted desired signal vector, H is the channel for desired signal, $H_i$ and $s_i$ are the channel and transmitted signal for interferer i, respectively, and n is the additive noise, which is assumed to be spatially white.

If no interference-related information is known other than interference plus noise power, it may be assumed that interference plus noise is spatially white, and MMSE receiver may be used:

$$\hat{s} = H^H(HH^H + \sigma_{I+n}^2 I)^{-1} x$$

where $\sigma_{I+n}^2$ is interference plus noise power, $\hat{s}$ is the estimate of s, $(\cdot)^H$ indicates Hermitian transpose of a matrix, and I is an identity matrix. For this type of receiver, the desired channel may need to be estimated. In addition to the desired channel, interference plus noise power may need to be estimated.

If the spatial statistics of the interference and the noise are known, an MMSE-IRC receiver may be used:

$$\hat{s} = H^H(HH^H + R_{I+n})^{-1} x$$

where $R_{I+n}$ is the interference plus noise covariance matrix. For this type of receiver, the desired channel may need to be estimated. In addition to the desired channel, the interference plus noise covariance matrix may need to be estimated.

If the spatial statistics of received total signal (the desired signal plus the interference and the noise) are known, another form of an MMSE-IRC receiver may be used:

$$\hat{s} = H^H(R_{d+I+n})^{-1} x$$

where $R_{d+I+n}$ is the desired signal plus interference plus noise covariance matrix. For this type of receiver, the desired channel may need to be estimated. In addition to the desired channel, the desired signal plus interference plus noise covariance matrix may need to be estimated.

If the deterministic interference channels and the power of the white noise are known, yet another form of an MMSE-IRC receiver may be used:

$$\hat{s} = H^H \left( HH^H + \sum_{i=1}^{p} H_i H_i^H + \sigma_n^2 I \right)^{-1} x$$

For this type of receiver, the desired channel from the serving cell may need to be estimated. In addition to the desired channel from the serving cell, interference channels and noise power may need to be estimated separately.

The channel state information of the interferers is typically needed for any of the above-mentioned advanced receivers to suppress interference.

If the macro cell layer and the small cell layer operate on the same frequency band, the macro cell may cause dominant interference to the cell-edge UEs associated with the small cell. Utilizing different frequency bands for the macro cell layer and the small cell layer may alleviate the dominant interference caused by the macro cell to the UEs attached to the small cells. However, when small cells are densely deployed, inter-cell interference between small cells may occur. One approach to handle this inter-cell interference is to perform radio resource coordination among the cells. Examples of this approach in the previous LTE releases include ICIC, eICIC, CS/CB, and dynamic point selection (DPS). These approaches rely on coordination between transmitters to avoid interference. For example, these approaches may involve muting the interfering cells, reducing the transmission power on the interfering cells, or requiring more channel state information feedback.

An alternative approach is to allow a well-controlled amount of interference between a selected set of adjacent small cells and rely on the interference cancellation or suppression capabilities of advanced UE receivers to mitigate this controlled interference. As the transmitter-based interference coordination schemes may not fully use the receiver capabilities of a UE, using the receiver-based approach has the potential to further improve spectral efficiency over the case with complete interference avoidance in a densely deployed small cell scenario.

With this background information in place, issues identified and addressed by the embodiments disclosed herein may now be described.

A scenario may be assumed herein in which multiple small cells are deployed in the coverage area of a macro cell. The small cells and the macro cell may be inter-connected through a backhaul. The macro cell may act as a centralized coordinator for all small cells under its coverage for the purposes of coordinating interference mitigation-related information.

The embodiments disclosed herein may also be applicable to other scenarios, for example, where one small cell acts as a coordinator, where small cells are deployed without macro cell coverage, in homogeneous deployment scenarios, in heterogeneous deployment scenarios, or in decentralized coordination schemes. It may also be noted that, although the discussion herein focuses on the downlink, the embodiments may also be applicable to uplink transmission.

To enable interference suppression, rejection, or cancellation in an LTE/LTE-A system, an advanced receiver may need to know some information about the interference, e.g., interference spatial information such as a channel or channel covariance matrix and, for certain receivers, the modulation and coding scheme corresponding to the interferer. Carefully designed and coordinated reference signals between neighboring cells may greatly improve the accuracy of the estimation of the channel from the serving cell and channels from interfering cells compared to the interference measurement scheme for advanced receivers in Rel-11, which relies only on a reference signal from the serving cell. That is, desired channel estimation and interference measurement based on coordinated reference signals between neighboring cells may outperform a scheme that does not employ coordinated reference signals, and thus the coordinating cells' reference signals may improve link and system performance.

Three sets of embodiments, which may stand alone or may be used in various combinations with one another, are disclosed herein. The first set of embodiments is directed toward DMRS-based interference estimation for the PDSCH. The second set of embodiments is directed toward zero power CSI-RS-based interference estimation for the PDSCH. The third set of embodiments is directed toward interference estimation for an enhanced PDCCH.

In the first set of embodiments, orthogonal DMRS ports may be configured for different cells or within the same cell, thereby facilitating inter-cell and intra-cell interference estimation and cancellation. Herein, the term "orthogonal DMRS ports" may refer to antenna ports where orthogonal DMRSs are transmitted. In the interest of brevity, unless otherwise noted, DMRS ports in these embodiments sometimes may refer to DMRSs transmitted on antenna ports 7-14 in 3GPP LTE. Because LTE DMRSs transmitted on antenna ports 7-14 are generated using a pseudo-random function that may be initialized with different values for different DMRSs on different antenna ports, certain DMRSs are only orthogonal when they have the same initializing values. The initializing values can depend on a cell identity, including a physical cell identity, or a virtual cell ID that can be signaled to the UE by higher layer signaling, and on a scrambling ID that is dynamically indicated to the UE. The cell ID may correspond to $N_{ID}^{cell}$, and to the virtual cell ID $n_{ID}^{DMRS,i}$, and the scrambling ID to $n_{SCID}$, where these variables are defined in 3GPP TS 36.211, section 6.10.3.1. To guarantee the orthogonality of DMRSs on different DMRS ports transmitted from different cells on the same set of REs, the same cell ID and the same scrambling ID may be used to initialize the pseudo-random sequences for DMRSs corresponding to the DMRS ports. Signaling of different DMRS ports for single-layer and multi-layer MIMO transmissions to a UE may be specified to support DMRS-based interference estimation for the PDSCH. As is well known in the art, it should be understood that this use of the term 'layer' for MIMO and spatial multiplexing is distinct from the macro and small cell layers earlier discussed. A spatially multiplexed or MIMO layer may be one or more modulation symbols in a time-frequency resource and may carry modulation symbols that are different from those of another spatially multiplexed layer, and spatially multiplexed layers may be transmitted in the same time-frequency resource. MIMO layers transmitted in a time-frequency resource may be intended for multiple UEs and may be transmitted from multiple cells, and therefore the interference between MIMO layers can be either or both of inter-cell interference and intra-cell interference. In the following discussion, a MIMO layer may be referred to as a layer for brevity.

More specifically, it may be assumed that neighboring small cells use DMRS-based transmission modes. In an embodiment, orthogonal DMRS ports are assigned to the neighboring interfering small cells to enable accurate estimation of the desired channel and the interference channels. The following coordination between the neighboring cells may occur to enable interference measurement and advanced interference suppression or cancellation. First, each small cell is informed of N total number of MIMO layers that could be used for co-channel transmissions in all the coordinated neighboring cells. Each small cell may be further informed of one or more RBs of interest in which the total number of MIMO layers applies. Next, small cell k is assigned $n_k$ DMRS ports, where $n_k$ is the maximum number of MIMO layers that should be transmitted from that small cell. Next, small cell k may schedule up to $n_k$ DMRS ports assigned to it to its served UEs on one or more RBs of interest. The assignment of DMRS ports used in the neighboring cells is coordinated, e.g., by a coordinating cell such as the macro cell, to avoid using the same DMRS ports in different cells ('collision'). The coordination may be, for example, via a backhaul link. Alternatively, the DMRS ports to be assigned to neighboring cells may be pre-configured.

The coordination of orthogonal DMRS ports in one or more RBs of interest among neighboring small cells may allow a cell-edge UE in a small cell to estimate the channel corresponding to its own serving small cell as well as the channel corresponding to a neighboring interfering small cell in the RB or RBs of interest. By utilizing this method, a UE may accurately estimate not only the interferer channel covariance matrix but also the channel gains corresponding to the interfering neighbor cells, both of which may be needed to achieve improved performance for UEs employing advanced receivers such as MMSE-IRC. There may be a trade-off between the available spatial dimension for the maximum number of layers of data transmission and interference estimation among different cells, which may be coordinated among cells. For example, if there is strong interference among cells, the orthogonal DMRS ports may be configured among cells to facilitate inter-cell interference estimation. If interference is weak among cells, the orthogonal DMRS ports may be configured within a cell to support MIMO transmission with a large number of layers. The coordination may be achieved semi-statically and may not require a large amount of dynamic information exchange among cells. Therefore, a backhaul with typical latency and bandwidth may be sufficient to handle such coordination. For example, as described in more detail below, the coordination among cells may require some information exchange such as the total number of MIMO layers that will be transmitted from all cells and the MIMO layers assigned to each cell. Such a coordination may not require a backhaul with low latency and high capacity, as required by some CoMP schemes such as JT and DPS.

In an LTE downlink transmission with DMRS ports, such as a PDSCH transmission or an enhanced PDCCH (EPDCCH) transmission, the PDSCH or EPDCCH is transmitted using one or more DMRS ports, such that each transmission (or transmission layer) is associated with a DMRS port with which a UE can demodulate the associated transmission (transmission layer). The signaling of the total number of transmission MIMO layers transmitted from a group of coordinated neighbor cells may facilitate the UE in conducting interference cancellation or suppression. For example, if a transmission is scheduled for a UE in physical resources that are coordinated with neighboring cells, and the total number of MIMO transmission layers in these resources is set to four, and the number of MIMO transmission layers to the UE itself is two, the UE will know that there may potentially be another two layers of signals transmitted on the same time-frequency resources to the other UEs. These additional two layers may act as interference to the UE. The UE may then try to measure and suppress or cancel the interference if the UE has four receive antennas.

The total number of MIMO transmission layers may be signaled to small cells from the macro cell or a coordinating small cell as part of a coordination configuration message. A small cell may then signal the number of MIMO transmission layers to the UE either semi-statically using higher layer signaling such as radio resource control (RRC) signaling or dynamically through downlink grants. Alternatively, such information may be predefined and not signaled to the UE. In either case, the small cells may need to ensure that the total number of MIMO transmission layers the small cells use for scheduling their own UEs does not exceed the total number of MIMO transmission layers signaled from the macro cell or the coordinating small cell.

The determination of the maximum number of MIMO transmission layers to a UE over RBs of interest may be based on the total number of MIMO transmission layers that UE can handle, including the useful layers of data transmission to the UE as well as all layers of interference transmission.

In addition to the total number of MIMO transmission layers signaled to the small cells, the allowed MIMO transmission layers for each small cell may need to be determined as well. For example, assuming the total number of MIMO transmission layers for two neighbor small cells under coordination is four, a simple split between the two cells may be used so that each small cell may transmit up to two layers. Alternatively, the allowed MIMO transmission layers for each small cell may be signaled as part of the coordination configuration. For example, one small cell may be configured with one MIMO transmission layer, while the other small cell may be configured with the other three MIMO transmission layers. The MIMO transmission layers and the corresponding DMRS ports assigned to each small cell may be signaled to the small cells by the macro cell or the coordinating small cell. For example, in the equal split case, one small cell may be configured with DMRS ports 7 and 8 and the other small cell with DMRS ports 9 and 10. In the other case, one small cell may be configured with DMRS port 7 and the other small cell with DMRS ports 8 to 10. Making such information configurable may make the loading of each small cell more flexible and may facilitate inter-cell interference cancellation.

Alternatively, if interference coordination resources are allocated for cell-edge UEs, where some coordination may be conducted over transmission from such resources, single-layer transmission may be used most of the time. So it may be specified that in co-channel interference coordination resources, only single-layer transmission is allowed. Such a specification may avoid specific assigned signaling of the number of MIMO transmission layers. That is, only the specific DMRS port assigned to each cell may need to be signaled. The total number of MIMO layers may then be used to determine the number of small cells signaled. In one example, if a total of two layers is desired, the macro eNB may signal to only two small cells with DMRS port allocation for coordination resources.

Alternatively, to avoid signaling the total number of layers associated with the coordination resources, the macro cell or the coordinating small cell may conservatively assume that all interference mitigation capable UEs can handle no more than two MIMO layers. Thus, only two small cells may be signaled for coordination resources. Each small cell may schedule only a single transmission layer on the coordination resources to UEs with the capability for interference cancellation.

In summary, to facilitate interference estimation and cancellation, orthogonal DMRS ports may be configured among different cells. Such a configuration may require coordination and signaling among cells and signaling within each cell. Regarding the coordination and signaling among cells, the total number of MIMO transmission layers may be signaled to the cells, e.g., as part of coordination configuration. In addition to signaling the number of MIMO transmission layers to a UE from the UE's serving cell, the total number of MIMO transmission layers, i.e., the transmission layers to the UE itself plus the transmission layers from other cells, may also be signaled to the UE in a downlink grant or by higher layer signaling such as RRC signaling. Alternatively, if the total number of MIMO transmission layers is predefined, such as two layers, no signaling may be needed. That is, assigned MIMO layers for each cell may be signaled to each cell or may be predefined for each cell.

Regarding the signaling within each cell, the assigned MIMO layers may be signaled to a UE in a downlink grant or by higher layer signaling. Alternatively, if the assigned MIMO layers are predefined, no signaling may be required.

Alternatively, a single transmission layer may be specified for each small cell by default and no signaling about the number of layers may be needed from the macro cell or the coordinating small cell to the small cells. Such a configuration may be applied to some designated interference coordination resources assigned to each cell.

In order to facilitate inter-cell interference cancellation or suppression, it may be useful to define a UE capability for such mitigation. In general, the total number of receive antennas determines the total number of transmitted MIMO layers that a UE can handle. For example, if a UE has four receive antennas, the UE can receive two single-user MIMO (SU-MIMO) layers intended for itself, while being able to cancel two MIMO layers of interference.

In current LTE specifications, an indication of the capability of a UE does not indicate the number of receive antennas a UE has, but rather indicates the number of MIMO layers the UE can receive. The number of MIMO layers that a UE can actually decode may not be directly determined by the number of antennas, which may only give the maximum possible number of MIMO layers that can be decoded. Therefore, in an embodiment, a new UE capability indication may be introduced for a UE with an advanced receiver to indicate how many receive antennas the UE has. Alternatively or additionally, a UE capability indication may be introduced to indicate how many layers a UE can process, including layers intended for the UE and layers of interference that the UE is capable of cancelling. For example, if a UE with an advanced receiver has the capability to process four layers, the UE may be able to process a total of four layers, including both MIMO layers intended for the UE and interfering layers that the UE may be able to cancel or suppress. Alternatively, the number of layers the UE can cancel or suppress may be determined from the UE's category and additionally or alternatively the number of MIMO layers the UE can receive in a band or band combination. If the UE can receive two, four, or eight layers, the UE may be assumed to be able to cancel up to one, three, or seven layers of interference, respectively. Additionally or alternatively, a capability indication may indicate that a UE can suppress interference from another cell and support signaling that identifies one or more DMRS ports that may be used to transmit on an interfering cell instead of a serving cell.

In summary, in an embodiment, one or more new UE capability indications may be defined for a UE with an advanced receiver. An indicator of the number of receive antennas on the UE may be defined and/or an indicator of the total number of MIMO layers that the UE can process, including intended layers and interfering layers, may be defined. A one-bit indication may indicate an advanced receiver with the capability for interference cancellation according to the embodiments described herein.

In transmission mode (TM) 7 and beyond, DMRS ports are used for PDSCH demodulation. A UE may be allocated a number of orthogonal DMRS ports, which may be signaled in downlink grants. For example, for (TM) 9, the DMRS ports are signaled dynamically in downlink control information (DCI) format 2C or DCI format 2D. To facilitate inter-cell interference cancellation, several aspects may need to be considered.

Figure 9:
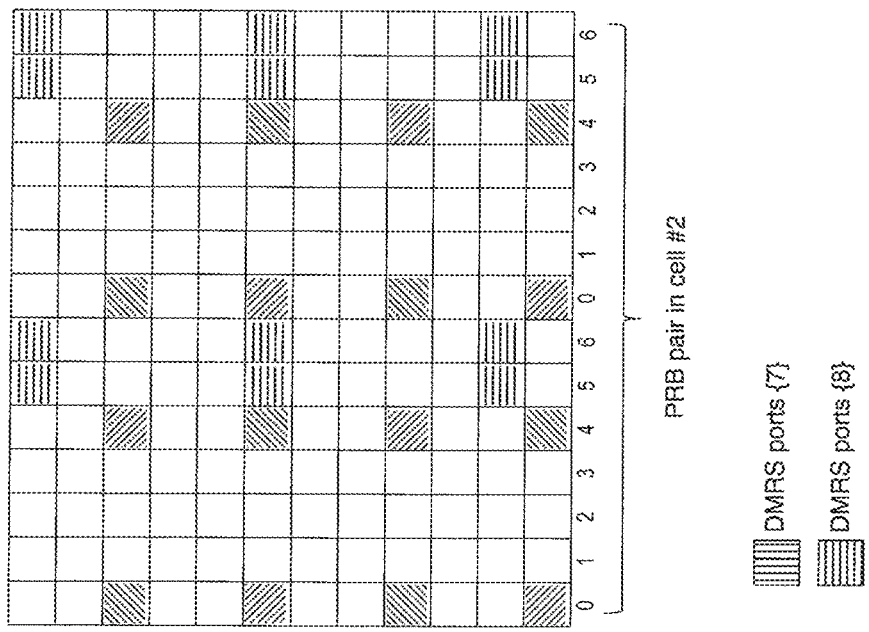
FIG. 9 is a diagram of an example of demodulation reference signal (DMRS) port assignments, according to an embodiment of the disclosure.
Figure 9:
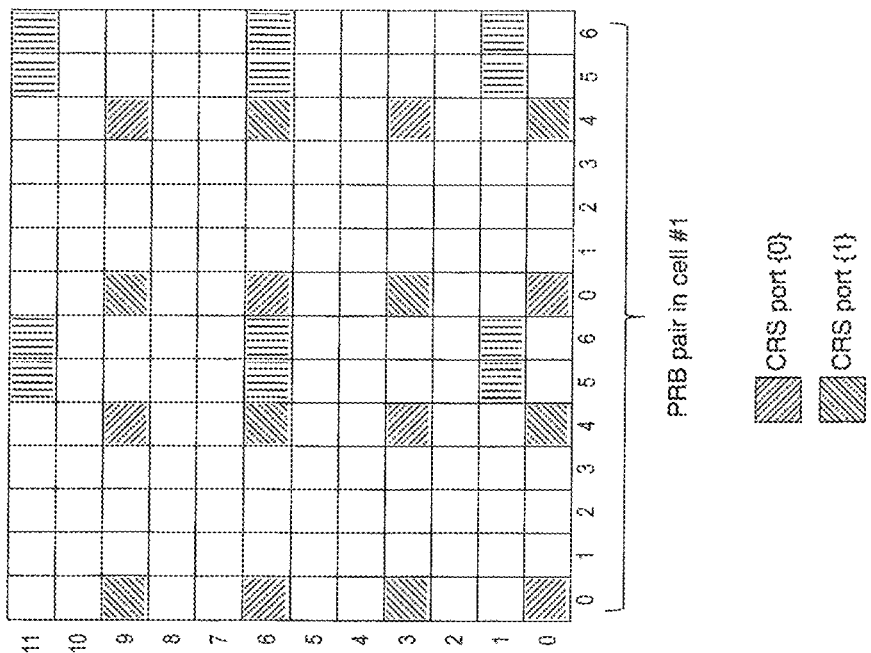

A first aspect to be considered is that, as DMRS sequences are generated by a cell ID and a scrambling ID, different DMRS ports from different cells may not be orthogonal to each other, because different DMRS sequences may be associated with different cell IDs. For example, as shown in FIG. 9, port 7 assigned to one cell is generally not orthogonal to port 8 assigned to a different cell. These non-orthogonal DMRS ports may degrade the channel estimation performance. In addition, a UE may need to know the cell ID and scrambling ID of DMRS from interference in order to estimate the interfering channel. Informing a UE about the cell ID and scrambling ID of other interfering cells may increase the signaling complexity.

To address this issue, in an embodiment, an eNB may configure those UEs that can conduct interference coordination and cancellation or suppression with the same cell ID and the same scrambling ID. Thus, orthogonality among DMRSs transmitted on different DMRS ports is guaranteed if different DMRS ports are assigned to different UEs. The corresponding DMRS sequence and scrambling sequence may be easily determined by the UEs, because the DMRS sequences are generated from lower frequency band to higher frequency band to cover the maximum system bandwidth of 110 PRBs. If the same cell ID and scrambling ID are used in different cells, the same DMRS sequences will be generated, and the same DMRS symbols will be transmitted on the same REs in the same PRBs from different cells. Thus, the orthogonality between DMRS ports, e.g., ports 7 and 8, is maintained if the DMRS ports are transmitted from different cells. In this embodiment, it may be assumed that the arrival timings of these signals from different cells, i.e., serving cell and neighbor cells, to the UE are about the same, e.g., within the cyclic prefix of an OFDM symbol.

In a small cell scenario, each small cell may synchronize to the macro cell by, e.g., the backhaul with location adjustment or through a downlink signal. As the propagation delay in a small cell scenario may not be large, such an assumption may be reasonable in a well synchronized network for the cell-edge UEs. For example, if port 7 is assigned to the UE of interest in one small cell and port 8 is assigned to an interfering UE in a neighboring small cell, then if the macro eNB or a coordinating small cell eNB configures the ports with the same cell ID and scrambling ID, the DMRS sequences generated for the two ports are the same and the two ports are orthogonal to each other. The UE of interest may derive its channel estimation from port 7 by de-spreading with its own orthogonal cover code. At the same time, the UE of interest may also estimate the channel to the interfering cell and conduct interference cancellation. With this mechanism, port 7 may be assigned to the UE of interest in the serving cell, while port 8 may be assigned to an interfering UE served by other cells.

A second aspect to be considered is that the DMRS ports assigned to UEs in a neighboring small cell may partially overlap with DMRS ports assigned to the UEs in the small cell of interest. For example, DMRS port 7 may be assigned to the small cell of interest, while DMRS ports {7,9} may be assigned to neighboring cells. For the DMRS ports that overlap, different DMRS scrambling sequences may be used in order for the UE in the cell of interest to suppress and estimate the interference.

A third aspect to be considered is that the assignment of orthogonal DMRS ports to different neighboring cells may be part of an interference coordination scheme and may be included in an inter-cell coordination message.

A fourth aspect to be considered is that if different DMRS ports are assigned among interference coordination cells, and the UE knows the DMRS ports, the UEs in a small cell of interest may detect if other DMRS ports that are not assigned to the UEs carry a reference signal intended for other UEs. Details regarding such a detection procedure are provided near the end of this Detailed Description section.

If such a reference signal is detected, the UE may try to estimate the channels on those DMRS ports in order to conduct interference cancellation or suppression. Alternatively, the DMRS ports assigned to the UEs in neighboring cells and/or sequences for those DMRS ports may be signaled to the UE in the cell of interest.

Figure 10:
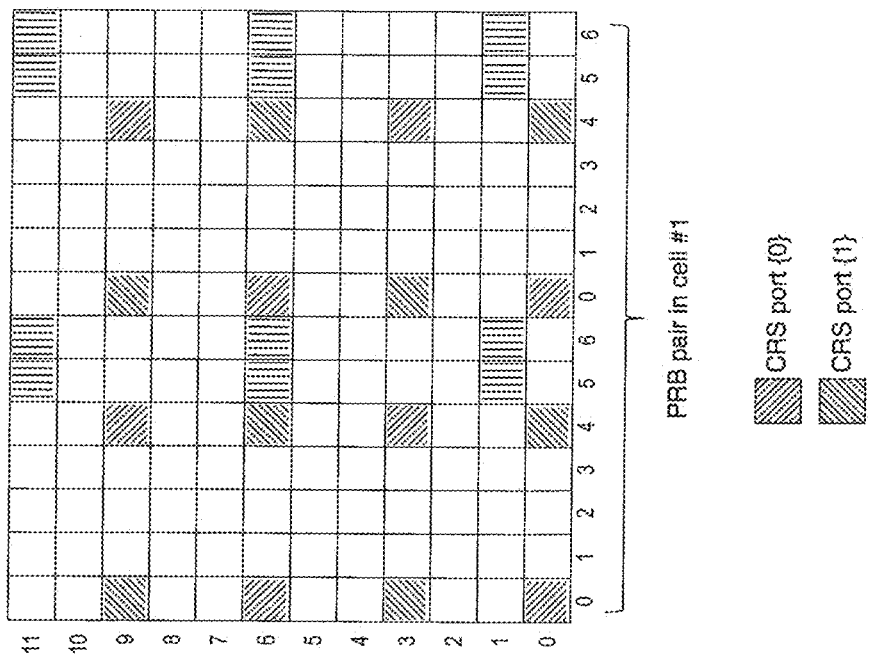
FIG. 10 is a diagram of another example of DMRS port assignments, according to an embodiment of the disclosure.
Figure 10:
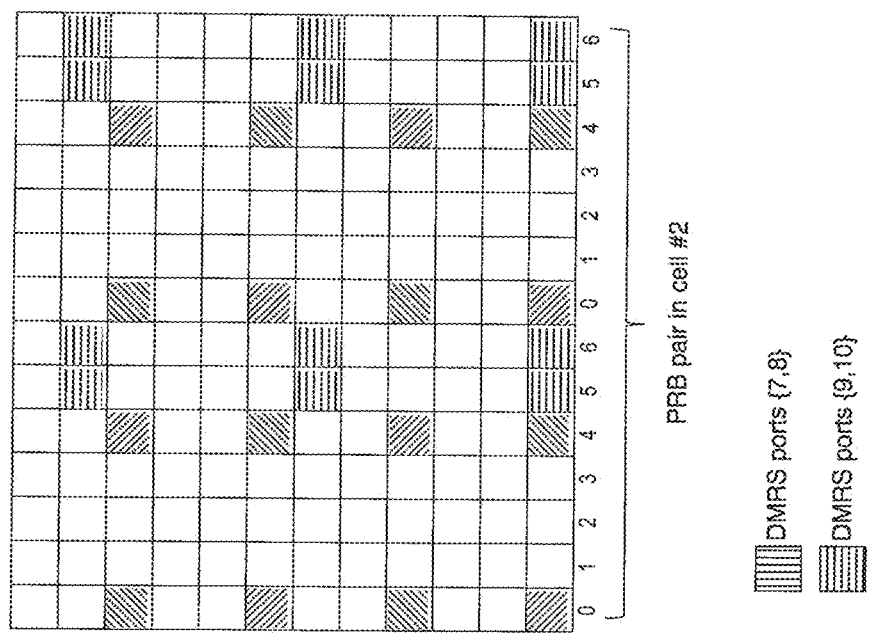

A fifth aspect to be considered is that, as defined in (TM) 9, port 7 and port 8 may be assigned to two UEs in the same cell in a multi-user MIMO (MU-MIMO) transmission. In order to continue to support MU-MIMO transmission in the same cell while at the same time supporting inter-cell interference cancellation, one pair of ports {7,8} may be allocated for one cell, and another pair of ports {9,10} may be allocated for another cell, as shown in FIG. 10. Such an allocation may allow the support of MU-MIMO transmission from one cell while cancelling or suppressing interference from another cell. In such a case, the REs that are used for transmitting DMRSs of DMRS ports in another cell may be left blank (not used) in the cell of interest (the serving cell) so that a UE may use those REs to estimate the inter-cell interference. For example, if the cell of interest transmits DMRS ports {7,8}, the cell may not transmit anything on REs reserved for DMRSs transmitted on DMRS ports {9,10}, and thus may let the UEs in the cell of interest use DMRSs transmitted on DMRS ports {9,10} to estimate interference from interfering cells.

A sixth aspect to be considered is that orthogonal DMRS ports occupying different REs, such as port 7 and port 9, may be assigned to UEs in different cells, but the DMRS sequences from the neighboring cells may not be known to the UE. In such cases, if a cell ID for the interfering DMRS port is not known to the UE, the UE may not be able to estimate the actual channel from the interferer. However, the UE may still be able to estimate the covariance matrix of the interferer channel and further conduct interference suppression, since port 7 and port 9 occupy orthogonal resources.

It may be noted that even if a small cell has been assigned with a certain number of MIMO layers, the small cell may transmit signals using a subset of the assigned MIMO layers. Interfered UEs may simply assume that the maximum number of assigned MIMO layers are transmitted from other interfering cells and try to detect or estimate the interfering signal through all the other unassigned DMRS ports. Details regarding such a detection procedure are provided near the end of this Detailed Description section.

If orthogonal DMRS ports are assigned to different UEs in different small cells to facilitate inter-cell interference cancellation, the DMRS ports assigned to each UE may be signaled in each UE's downlink grant. For example, if there is a total of four DMRS ports, two DMRS ports may be assigned to each of the two different cells, such as DMRS ports {7,8} to one cell and DMRS ports {9,10} to another cell. Then DMRS ports such as ports {7,8} may need to be assigned and signaled to a UE in one cell, while DMRS ports such as ports {9,10} may need to be signaled to another UE in another cell. In (TM) 9, where DCI format 2C is used, or in (TM) 10, where DCI format 2D is used, such DMRS port assignment is not supported, as each UE receiving two layers of data may use DMRS ports {7,8} only. To accommodate such a requirement, DCI formats 2C or 2D may be modified. Table 1 shows an example of such signaling. It may be observed from the table that a UE may be allocated DMRS ports {7,8} or {9,10}. Similar changes are also applicable to three-layer or four-layer MIMO transmissions. Such DMRS port signaling supports the assignment of different DMRS ports to the same number of layers. For example, for single-layer transmission, DMRS ports 7 or 8 may be assigned, and for two layer transmission, DMRS ports {7,8} or {9,10} may be assigned. Such flexibility allows allocations of different orthogonal DMRS ports to different UEs and may therefore facilitate interference suppression or cancellation.

TABLE 1

Modified DMRS port signaling to support 2-layer transmission with ports 9 and 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 | 4 | 3 layers, ports 7-9, or 7, 8, 11 |
| 5 | 2 layers, ports 9-10 | 5 | 3 layers, ports 10-12, or 9, 10, 13 |
| 6 | 3 layers, ports 7-9 | 6 | 4 layers, ports 7-10 |
| 7 | 4 layers, ports 7-10 | 7 | 4 layers, ports 11-14 |

DMRS port signaling as described in Table 1 may not only benefit inter-cell interference estimation and cancellation, but may also benefit intra-cell interference estimation. For the former case, for example, DMRS ports {7,8} may be used to demodulate the PDSCH in one cell, while DMRS ports {9,10} may be used to demodulate the PDSCH in another cell. Thus, the DMRS ports in those cells are orthogonal to each other, and improved performance of inter-cell interference estimation and cancellation may therefore be facilitated. Such signaling may also be used in the intra-cell case. For example, in a MU-MIMO transmission, one UE may be scheduled with the PDSCH using DMRS ports {7,8}, while another UE may be scheduled with the PDSCH using DMRS ports {9,10}. Such scheduling may also improve channel estimation in the MU-MIMO transmission. For the inter-cell case, some coordination may be needed between cells regarding which DMRS ports are used, but for the intra-cell case, no such coordination may be needed. The coordination between cells in either case may be done by simply indicating which DMRS ports each cell is to use. For example, one cell may only use DMRS ports {7,8}, while the other cell may only use DMRS ports {9,10}. Indication of the ports in this manner may facilitate the interference estimation. In the case where DMRS port 7 is assigned to one cell while DMRS port 8 is assigned to another cell, a cell ID and a scrambling ID used to generate DMRS sequences may be exchanged among the cells as well.

When only one MIMO layer for each cell is used for PDSCH transmission, for example in a small cell deployment, the DMRS port to be used by one cell may also be determined and signaled to another cell. For example, Cell #1 may be signaled with DMRS port 7, while the interfering Cell #2 may be signaled with DMRS port 9. Cell #1 may schedule the UEs with DMRS port 7, and the DMRS port information may also be signaled to the UEs. Similarly, in Cell #2, DMRS port 9 may be used, and the DMRS port information may be signaled to Cell #2's UEs. In both cells, the eNBs and the UEs may assume that the REs for DMRS port 7 in Cell #2 and DMRS port 9 in Cell #1 are not used for data transmissions. Since the time-frequency resources used by DMRS port 7 and DMRS port 9 are orthogonal, the UEs in Cell #1 may estimate interference by using DMRS port 9 resources. Similarly, UEs in Cell #2 may estimate interference by using DMRS 7 resources.

In an embodiment, to support the above concepts, the current DMRS port signaling in LTE may be modified to include an option of "1 layer, port 9". The addition of this option as a new entry in Table 1 may require one extra bit, i.e., from the current three bits to four bits. Alternatively, one bit may be added in the DCI to indicate transmission on coordinated resources, and some of the entries in Table 1 may then be re-interpreted. For example, if the new bit is set, ports 7 and 8 may be reinterpreted as ports 9 and 10 in the cases of one-layer and two-layer transmission. As yet another example, when the bit is set, the current entry for one codeword and value=2 may be reinterpreted as 1 layer, port 9. Table 2 shows such an example where DMRS ports 7 and 9 are both used for single-layer transmission. The UE may also interpret this as an indication that the REs used for port 7 and port 9 will not be used for data transmission, even when total layer is set as 2. Using ports 7 and 9 for single-layer transmission may provide an opportunity for power boosting, as these two ports use different RE pairs. Interference estimation may also be facilitated. For example, if one port, e.g., port 7, is used for data transmission in one cell, the UE may estimate interference on port 9, which uses RE pairs other than those used by port 7. In this way, the accuracy of interference estimation may be improved, and interference cancellation performance may therefore be enhanced.

TABLE 2

Alternative DMRS port signaling to support single layer transmission over port 9

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 9, $n_{SCID} = 0$ | 2 | 2 layers, ports 9-10, $n_{SCID} = 0$ |
| 3 | 1 layer, port 9, $n_{SCID} = 1$ | 3 | 2 layers, ports 9-10, $n_{SCID} = 1$ |
| 4 | 2 layers, ports 7-8 | 4 | 3 layers, ports 7-9, or 7, 8, 11 |
| 5 | 2 layers, ports 9-10 | 5 | 3 layers, ports 10-12, or 9, 10, 13 |
| 6 | 3 layers, ports 7-9 | 6 | 4 layers, ports 7-10 |
| 7 | 4 layers, ports 7-10 | 7 | 4 layers, ports 11-14 |

Alternatively, more DMRS ports, e.g., ports {7,8,9,10}, may be used for single-layer MIMO transmission for a UE, and more pairs of ports, e.g., port pairs {7,8},{9,10},{11,12},{13,14} or ({7,8},{9,10},{11,13},{12,14}), may be used for two-layer MIMO transmission for a UE. The additional ports or pairs of ports may provide more flexibility for intra-cell and inter-cell interference estimation and cancellation. To support such port usage, the DMRS port signaling shown in Table 2 may be modified, e.g., as shown in Table 3. With such flexibility, different ports may be used in different cells. For example, ports {7,8,9,10}, each may be used in one cell among a total of four cells. The port in each cell would then be orthogonal to the other ports, and inter-cell interference estimation and cancellation may be facilitated. Alternatively, two ports {7,8} may be used in one cell to support one-layer MU-MIMO transmission or two-layer SU-MIMO transmission, while ports {9,10} may be used in another cell to support the same type of transmission. Alternatively, port 9 may be used in one cell, while port 10 may be used in another cell.

TABLE 3

Example of DMRS port signaling

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7 | 0 | 2 layers, ports 7-8 |
| 1 | 1 layer, port 8 | 1 | 2 layers, ports 9-10 |
| 2 | 1 layer, port 9 | 2 | 2 layers, ports 11-12 or 11, 13 |
| 3 | 1 layer, port 10 | 3 | 2 layers, ports 13-14 or 12, 14 |
| 4 | 2 layers, ports 7-8 | 4 | 3 layers, ports 7-9, or 7, 8, 11 |
| 5 | 2 layers, ports 9-10 | 5 | 3 layers, ports 10-12, or 9, 10, 12 |
| 6 | 3 layers, ports 7-9 | 6 | 4 layers, ports 7-10 |
| 7 | 4 layers, ports 7-10 | 7 | 4 layers, ports 11-14 |

In summary, a cell ID and a scrambling ID may be used to generate DMRS sequences for different cells. Orthogonal DMRS ports may be assigned to UEs in different cells or within the same cell. The DMRS ports and/or the corresponding DMRS sequences of an interfering UE may be signaled in downlink grants to the UE of interest. Different groups of DMRS ports may be signaled to the UE of interest in the UE's downlink grant for the UE's PDSCH demodulation. The total number of layers in the coordination resources may be signaled to a UE in a downlink grant.

An issue that may arise in supporting the interference cancellation disclosed herein is rate matching. In LTE Rel-8 through Rel-11, when a serving cell transmits a PDSCH to a UE in a subframe, the number of DMRS ports used for the PDSCH is determined from the number of layers occupied by the PDSCH. Therefore, the REs used to transmit DMRS on interfering DMRS ports from other cells may also be used to transmit PDSCH to the UE in the serving cell. Consequently, there may be no blank REs in the time-frequency resource grid on the serving cell that are suitable for estimating interference from other cells. In an embodiment, one or more of several approaches may be used to address this issue.

Figure 11:
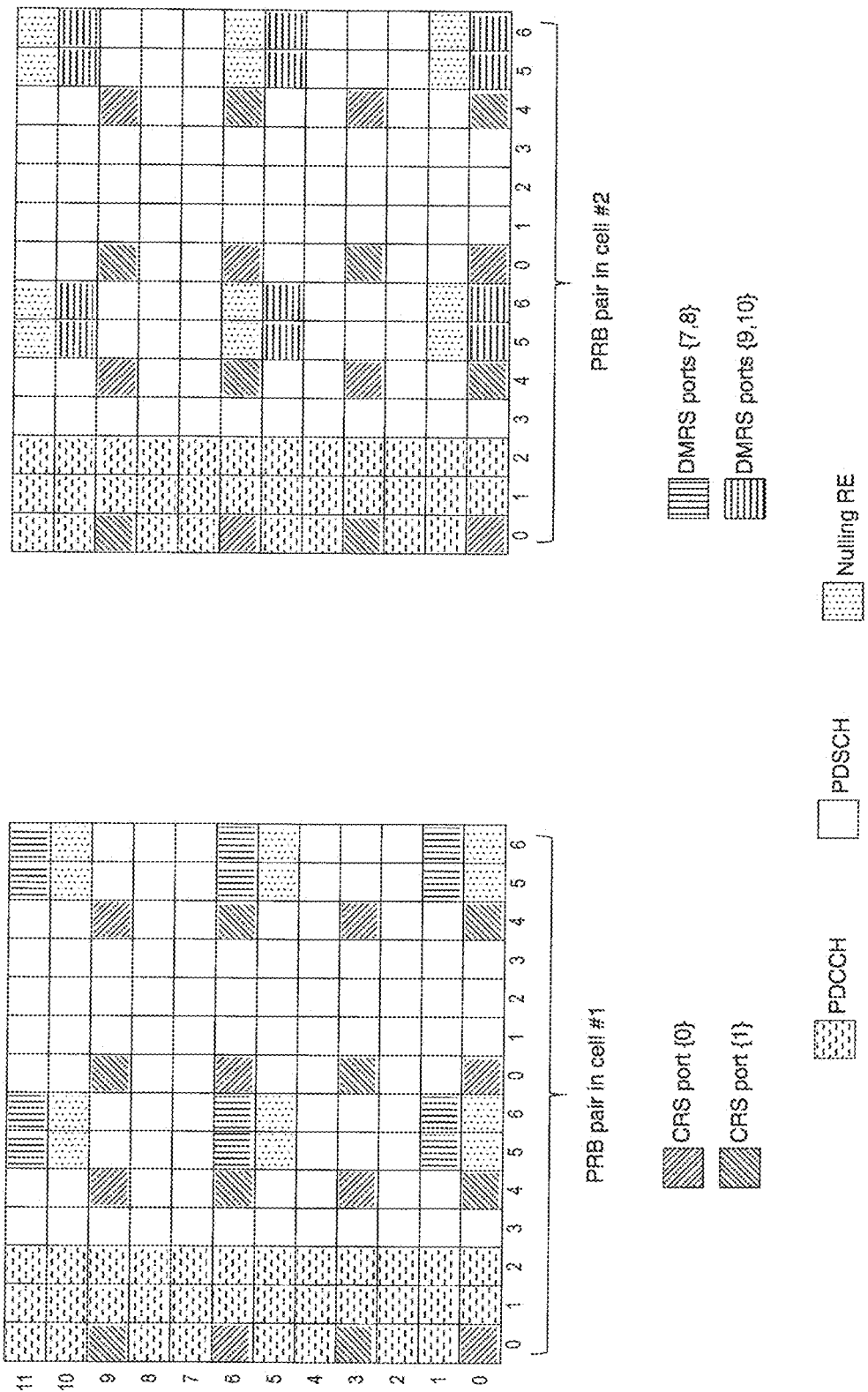
FIG. 11 is a diagram of a rate matching example for orthogonal DMRS assignment among cells, according to an embodiment of the disclosure.

A first approach may be to not transmit on REs reserved for interference measurement, where the reserved REs are a subset of REs used for DMRS transmission on DMRS ports 7 to 14 which, as defined in Rel-10, occupy a total of 24 REs in a PRB pair. In such cases, DMRSs of DMRS ports assigned to the PDSCH are transmitted as in LTE Rel-8 through Rel-10. However, as they are reserved for interference measurement, REs of DMRSs not assigned to the PDSCH of the UE are not occupied by the PDSCH as they would typically be, and the PDSCH is rate matched assuming that the reserved REs are not available for PDSCH transmission. In order to limit overhead, the number of reserved REs may be fewer than those used for a DMRS, and the REs of a DMRS that are not reserved REs may be used for PDSCH transmission. Such an approach may avoid collisions between the PDSCH in the serving cell and the DMRS transmitted on interfering cells. FIG. 11 shows an example of this approach where the reserved REs (labeled 'nulling REs' in the figure) are not occupied by PDSCH transmissions of the serving cell.

In a more general embodiment, the reserved REs for interference may correspond to those typically used by the PDSCH. In this case, the REs occupied by one or more DMRSs should not be used as the reserved REs, since the DMRSs do not occupy REs used by the PDSCH. If CRSs or CSI-RSs are transmitted, it may also be desirable to exclude REs occupied by CRSs or CSI-RSs from the reserved REs.

It may also be desirable that the reserved REs not occupy some common channels such as PBCH or PSS/SSS. Furthermore, a sufficient number of REs should be used to allow adequate interference measurement accuracy of time varying interference, which may require that the REs are present in each subframe in which a PDSCH is transmitted to the UE. The reserved REs therefore may be present in each subframe when a PDSCH is transmitted to the UE, may be those that occupy a plurality of resource elements in a resource block containing the PDSCH, may be left blank or transmitted with zero power in the serving cell, and may comprise at least those which are not occupied by REs used for DMRS on any DMRS port.

In both the first approach and the more general embodiment, the presence of the reserved REs may be indicated by higher layer signaling such as RRC signaling, or the reserved REs may be restricted to being present according to the PDSCH transmission mode.

In a second approach, the total layers of transmission (both intra-cell and inter-cell) may be signaled dynamically in DCI, such that the UE knows which REs are used for DMRS transmission on the serving and interfering cells, respectively. The REs used for DMRS transmission on the interfering cell are then not used for the UE's PDSCH transmission in the serving cell. Such signaling may be implemented with new signaling in DCI, which may require two bits to signal a total of four layers.

A third approach may be to semi-statically configure a UE to assume a total number of layers of transmission. For example, either 2 or 4 may be configured as the total number of transmission layers. Then the UE may assume that the REs used for corresponding DMRS ports are not used for the UE's PDSCH transmission. For example, if a total number of transmission layers of 2 is configured, then ports {7,8} may be used, and the UE may assume that those REs reserved for DMRS on ports {9,10} may be used for the UE's PDSCH transmission. If a total number of transmission layers of 4 is configured, then the UE may assume that all 24 REs reserved for ports {7,8,9,10} are not available for the UE's PDSCH transmission.

Even though a UE may have the capability to cancel or suppress inter-cell interference, the UE may not always use this function to cancel or suppress inter-cell interference. This may be due to the fact that the network does not support the corresponding interference coordination scheme or the allocation of orthogonal DMRS ports among UEs in neighboring cells. In an embodiment, a UE may be enabled to apply such a function through the introduction of a new transmission mode. For example, TM 11 may be used to enable such a function in interference coordinated resources among neighboring cells. A corresponding DCI format, e.g., DCI format 2E, may be introduced for TM 11. Such a new DCI format may accommodate the DMRS port signaling described above. Alternatively, if a UE is scheduled with the PDSCH in designated interference-coordinated resources, interference mitigation in the UE may be automatically enabled.

In other words, inter-cell interference mitigation in the UE may be enabled by a new TM, e.g., TM 11, whose corresponding DCI format may be DCI format 2E, or inter-cell interference cancellation may be enabled for a UE with such a capability when the UE's PDSCH is scheduled in interference-coordinated resources.

In the second set of embodiments, zero power (ZP) CSI-RS-based interference estimation for the PDSCH may be used. ZP CSI-RS and non-zero power (NZP) CSI-RS were introduced in Rel-10 to support reporting channel state information when CRS-based reporting is not suitable or when a CRS is not available. ZP or NZP CSI-RS may be configured with a periodicity from 5 subframes to 80 subframes. For frequency division duplex (FDD) systems, there are ten configurations for the ZP CSI-RS. For each configuration, the eNB does not transmit any signal (zero power) on the REs corresponding to the 4-port CSI-RS with the same configuration. In Rel-10, in case of overlap, NZP CSI-RS signaling overwrites the ZP CSI-RS. In Rel-10, a cell may have zero or more ZP CSI-RS configurations.

In an embodiment, to estimate interference and to take the precoding matrix of the interferer into the estimation, one or more ZP CSI-RS configurations for a serving cell are provided, and neighboring cells are ensured to not have NZP CSI-RS or ZP CSI-RS over those REs. If a neighboring cell is operating in a transmission mode that does not support CSI-RS transmission, no coordination may be required. That is, the neighboring cell may operate as usual.

With this CSI-RS coordination, the signal that a UE receives over the ZP CSI-RS REs represents the superposition of the signals transmitted by the neighboring cells plus random thermal noise. Measuring this signal, an advanced UE may be able to estimate some statistics of the interferers, e.g., the covariance matrix of the interference plus noise. The UE may then use this information for interference mitigation, for instance in MMSE-IRC. The interference mitigation techniques may be applied to inter-cell interference caused by the PDSCH from neighbor cells.

As an example, a scenario may be considered where multiple small cells are operating under the coverage of a macro eNB, and the macro eNB is able to perform the required coordination between the small cells. The embodiments disclosed herein are not limited to this scenario, and may be applicable to other network settings such as cases where the coordination is performed by a neighboring eNB or by a plurality of neighboring eNBs performing the coordination in a distributed manner. In any case, the coordination is performed such that the following information is conveyed to the eNBs and UEs.

Figure 12:
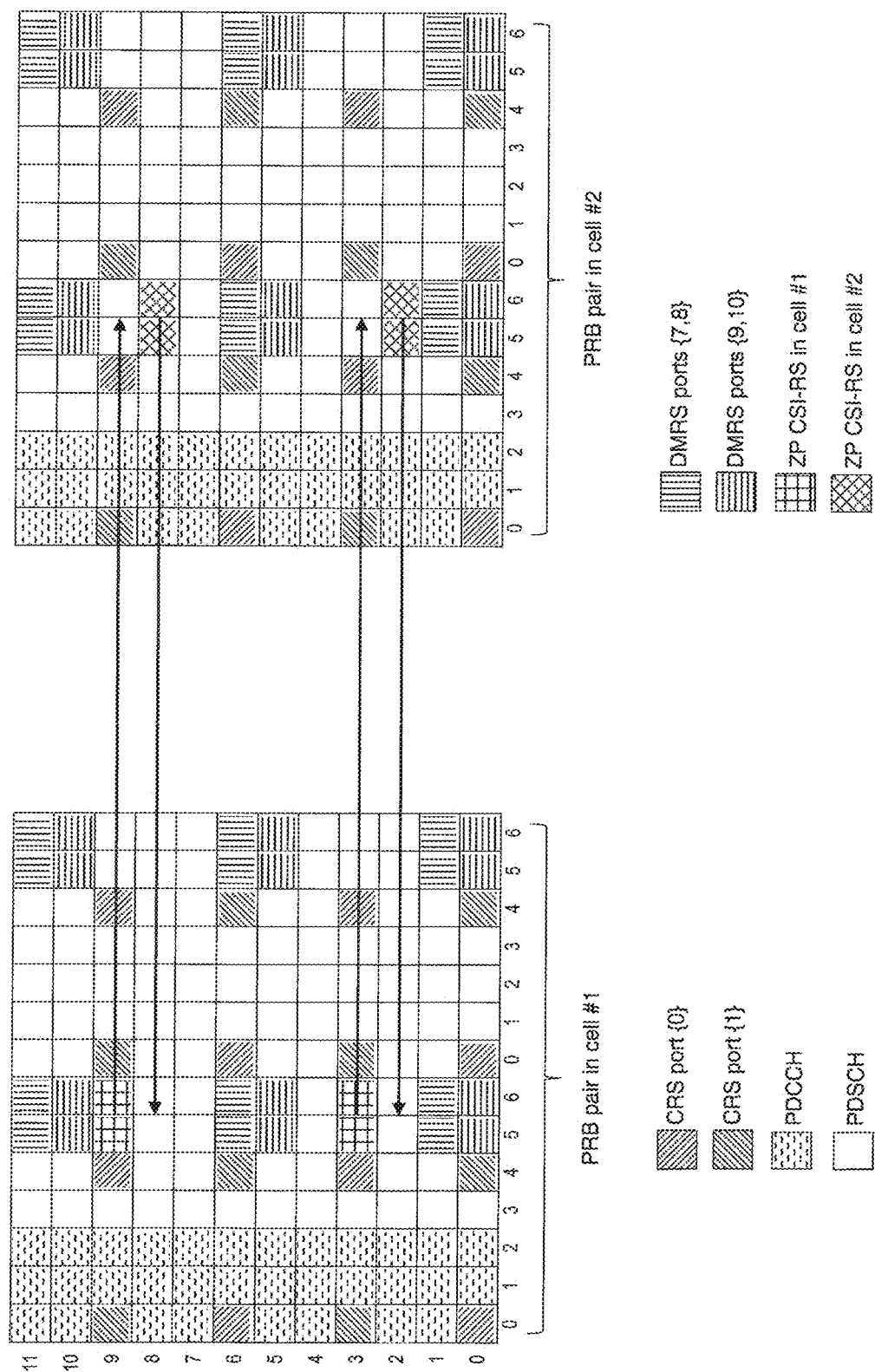
FIG. 12 is a diagram of ZP CSI-RS configuration and coordination among cells, according to an embodiment of the disclosure.

First, an eNB may need to be informed about the ZP CSI-RS resources that are assigned to the eNB. The eNB knows that its ZP CSI-RS REs do not overlap with NZP CSI-RS or ZP CSI-RS REs in the neighboring cells. Namely, the eNB's ZP CSI-RS overlaps with PDSCH transmission in the neighboring cells. An example is shown in FIG. 12. The assignment of ZP CSI-RS resources may be updated periodically. Also, it may be possible to assign more than one ZP CSI-RS configuration for each cell. The number of assigned ZP CSI-RS configurations (or resources) may depend on the required accuracy of interference channel estimation, the dynamics of the channel, the resulting overhead of the ZP CSI-RS, and the impact to legacy UEs. In addition, it is possible that no ZP CSI-RS is assigned to some of the cells, such as when no UE with an advanced receiver that can take advantage of the interference estimation resources is present in a cell. Therefore, it may be preferable to not reserve any resources for ZP CSI-RS transmission in this case. Further, in contrast to Rel-10 where the ZP CSI-RS is configured over the entire bandwidth, a sub-band ZP CSI-RS or a UE-assigned-band ZP CSI-RS may potentially reduce the overhead of ZP CSI-RS transmission and reduce the impact to legacy UEs.

Second, each eNB may need to be notified about the ZP CSI-RS configurations that are used in the neighboring cells. If a cell's ZP CSI-RS configuration is used by a neighbor cell for interference estimation, an eNB may need to avoid configuring any NZP CSI-RS or ZP CSI-RS over the same REs. However, if the eNB does not operate in TM 9, the eNB may not need to receive this information. The assignment may be updated periodically, or some of the ZP CSI-RS for each cell may be semi-statically reserved. Event-based updating is another option. That is, the list of ZP CSI-RS configurations among neighbor cells may be updated whenever a new cell may need to use the interference estimation resources and may need to configure the new cell's own ZP CSI-RS for interference estimation. The eNB may not need to know which neighboring cell uses which ZP CSI-RS resources. It may suffice that the eNB knows that those ZP CSI-RS configurations may be applied in one of the eNB's neighbors.

Third, the following aspects may need to be considered for a UE with an advanced receiver. Such a UE may need to be scheduled in a transmission mode that supports ZP CSI-RS transmission, such as TM 9 or a new transmission mode that is aware of the ZP CSI-RS. The UEs operating in a neighboring cell may be scheduled in TM 9 or any other transmission mode. In an embodiment, a new ZP CSI-RS indication may be used so that a UE knows that the resources that the UE's serving eNB used for transmission of the ZP CSI-RS under a given configuration are dedicated for interference estimation and are coordinated with the eNB's neighbors. The configuration of the ZP CSI-RS may be different from those configured for CoMP or may be the same as some of the ZP CSI-RS configurations for CoMP. This configuration may be signaled separately from the CoMP CSI process configuration. The Rel-10 ZP CSI-RS may be reused for this purpose, or an indication may be added to indicate that the CSI-RS configuration is for interference estimation purposes.

It may be noted that the interference measurement results in CoMP are generally used for PMI/CQI (pre-coding matrix indicator/channel quality indicator) calculation, while the disclosed embodiments use the signal at ZP CSI-RS REs to estimate the total effect of all interfering cells, i.e., the combined channel and the precoding matrix. In addition, in CoMP, several interference measurement resources (IMR) configurations may each represent one possible CoMP hypothesis, while in the disclosed embodiments only the total effect of interference from neighboring cells using ZP CSI-RS configuration may need to be estimated.

The coordination described above may occur in several ways. In some embodiments, the coordination occurs in networks with a coordinator. In such cases, the coordinator may send each cell a message containing, for example, 16 fields. Each field may correspond to one of the 16 different ZP CSI-RS configurations, i.e., ten configurations for both FDD/TDD and six configurations for TDD (time division duplex) only. Each field of the message may take one of the three values in Table 4.

TABLE 4

| Index | Name | Description |
| --- | --- | --- |
| 1 | Not used | This ZP CSI-RS configuration is not used in the neighboring cell. |
| 2 | Neighbor ZP-IE | This ZP CSI-RS configuration is used by one of the neighboring cells (this eNB should avoid transmission of NZP CSI-RS or ZP CSI-RS over these REs) |
| 3 | ZP-IE | This ZP CSI-RS configuration is assigned to this cell. |

The following remarks may be noted with regard to coordination by a coordinator. The message sent by the coordinator may be updated periodically or may be event-based, wherein the message is updated upon a change occurring in the network settings. In the case of a sub-band or UE-assigned-band ZP CSI-RS, the coordinator may need to notify the eNBs regarding the RBs in which the ZP CSI-RSs are transmitted. In Rel-10, the eNB is allowed to configure some NZP CSI-RS configurations, although the configurations may have some overlap with some of the configured ZP CSI-RS. To ensure that the ZP CSI-RS REs that are assigned to interference estimation are free from the serving node transmitted signal, the eNB may not schedule any transmission in the region assigned to these ZP CSI-RSs. Also, the eNB may configure other ZP CSI-RSs for reasons other than interference estimation. The configuration for these ZP CSI-RSs may be selected such that the configuration is different from the configurations that are indicated in Table 4 as "ZP-IE" or "Neighbor ZP-IE".

Alternatively, if all ZP CSI-RS and NZP CSI-RS configurations are assigned by a coordinator, CSI-RS collision may not be a concern in each cell. The coordinator may ensure that there is no overlap of CSI-RS configurations in neighbor cells. Thus, only information about the NZP CSI-RS or ZP CSI-RS assigned to the cell of interest may need to be signaled.

In other embodiments, the coordination described above may occur in networks with no centralized coordinator. That is, there may be distributed coordination wherein, in a plurality of network elements, none of the network elements has greater coordinating capabilities than any of the other network elements. Instead, one or more network elements may act as a peer coordinating element with one or more other network elements. In these scenarios, each cell may transmit to each of its neighbors a message containing, for example, 16 fields. Each field may correspond to one of the ZP CSI-RS configurations. Each field of the message may take one of the four values in Table 5.

TABLE 5

| Index | Name | Description |
| --- | --- | --- |
| 1 | Not used | This CSI-RS configuration is not used in this cell. |
| 2 | ZP-IE | This ZP CSI-RS configuration is used by this cell and it is used for interference estimation. |
| 3 | ZP-IM | This ZP CSI-RS configuration is used by this cell and it is used for interference measurement (e.g., for CoMP) |
| 4 | NZP | This NZP CSI-RS configuration is used by this cell |

The total CSI-RS port number for NZP CSI-RS may need to be signaled in addition to the above configuration fields. The additional signaling may require two bits. Alternatively, separate messages may be used to indicate the use of different CSI-RS configurations for the current cell. For example, one message may indicate a ZP CSI-RS for interference estimation, one message may indicate a ZP CSI-RS for interference measurement (for CQI), and one message may indicate an NZP CSI-RS configuration for the current cell.

Upon receiving such a message, the neighbor cells may try not to schedule any NZP CSI-RS or ZP CSI-RS in the REs allocated to the ZP CSI-RS that are marked as "ZP-IE". A neighbor cell may also configure its own interference estimation ZP CSI-RS such that the ZP CSI-RS does not collide with the REs used for NZP CSI-RS and ZP CSI-RS transmission in the neighboring cells.

The following remarks may be noted with regard to coordination without a centralized coordinator. The message sent by each cell may be updated periodically or may be event-based, wherein the message is updated upon a change occurring in the network settings. In the case of a sub-band or UE-specific ZP CSI-RS, an eNB may also inform its neighbors about the RBs in which the eNB transmits the ZP CSI-RSs. In Rel-10, the eNB is allowed to configure some NZP CSI-RS configurations where the configurations may have some overlap with some of the configured ZP CSI-RS. To ensure that the ZP CSI-RS REs that are assigned to interference estimation are free from the serving node transmitted signal, the eNB may not schedule any transmission in the region assigned to these ZP CSI-RSs.

Alternatively, if a "bit-map" style of signaling is not used, only the configured ZP CSI-RS and NZP CSI-RS may need to be signaled to a neighboring cell.

In Rel-10, there is a 16-bit bitmap which conveys the configuration of the ZP CSI-RS to the UE. To enable an advanced receiver to estimate interference, it may also be necessary to tell the UE which of the configured ZP CSI-RSs is to be used for interference estimation. This extra information may be required since there may be some other ZP CSI-RS configurations that the eNB uses in the same subframe but that are not intended for interference estimation and that therefore are not coordinated with the neighboring cells. To send this message to the UE, the eNB may send another information element in addition to the current 16-bit bitmap to indicate which ZP CSI-RS configurations are to be used for interference estimation. As ZP CSI-RS configurations for Rel-11 CoMP may be signaled under the CSI-RS process format for CoMP, the Rel-10 ZP CSI-RS configuration may be reused for the UE to conduct interference estimation if no other ZP CSI-RS resources other than those configured for CoMP and interference estimation will be used.

Since the CSI-RS is mainly introduced for CQI/PMI calculation, in Rel-10 the CSI-RS covers the entire transmission band. Therefore, if it is assumed that only some of the UEs have advanced receiver capabilities, the allocation of the ZP CSI-RS for interference estimation in the entire band may not be efficient. As an alternative, in an embodiment, the ZP CSI-RS may be configured for only a sub-band or even for a specific UE. In this way there may be no need to mute the REs on the RBs where no UE will perform interference estimation. If a sub-band or UE-specific ZP CSI-RS is used, this fact may be transmitted to the neighboring cells as well. In this case, the sub-band information may be included in the messages to the other cells.

Within each cell, each UE may be configured with a ZP CSI-RS within one or multiple sub-bands for interference estimation. In an embodiment, the current ZP CSI-RS configuration may be modified to include some sub-band information for this purpose. Alternatively, if such sub-bands are preconfigured for each cell for interference coordination or cancellation, such a sub-band indication in the ZP CSI-RS may not be needed. The transmission of such a ZP CSI-RS may be limited to preconfigured sub-bands within each cell. A UE capable of conducting interference cancellation may be allocated to such sub-bands or resources and may use such a ZP CSI-RS for interference estimation.

Alternatively, the ZP CSI-RS REs for interference estimation may occur in all PRBs and all subframes used for PDSCH transmission. In other words, an eNB may mute a few REs in the PDSCH transmission according to a ZP CSI-RS configuration for a UE with an advanced receiver. The UE may be signaled, e.g., via higher layer signaling such as RRC signaling, about the ZP CSI-RS resource configuration so that the UE knows which REs are muted.

The subframe configuration may not be needed, as the ZP CSI-RS is transmitted in every subframe in which the PDSCH is transmitted.

In contrast with the DMRS-based scheme described above, when the ZP CSI-RS is used to estimate interference, the DMRS or CRS may still be contaminated by interference. Due to this interference, the estimation of the desired channel may not occur properly. It may be noted that, in the DMRS-based scheme, the DMRS transmissions are coordinated over the neighboring cells, and therefore the DMRS transmissions may generate less interference with one another.

When the ZP CSI-RS interference estimation scheme is used, one way to minimize the effect of interference on the desired channel estimation is to first use the ZP CSI-RS to estimate the interference and then apply this information to suppress the interference on the DMRS or CRS. The resulting signal may then be used to perform desired channel estimation. This procedure may improve the accuracy of the desired channel estimation.

If a sub-band or UE PDSCH-specific band ZP CSI-RS is configured for interference estimation, the eNB and the UE may perform rate matching around the ZP CSI-RS REs. If a wideband ZP CSI-RS is configured for interference estimation, to minimize the impact to legacy UEs, the eNB may perform RE puncturing in the PDSCH transmission for legacy UEs and perform rate matching in the PDSCH for advanced UEs. In RE puncturing, the eNB assumes the ZP CSI-RS REs are available when performing channel encoding and mutes those REs when transmitting the PDSCH.

In the third set of embodiments, interference estimation is performed on an enhanced PDCCH (EPDCCH). When the control information that has traditionally been placed in the legacy PDCCH region is instead placed in a portion of the PDSCH region, the control information may be referred to as the EPDCCH.

Interference on the EPDCCH may come from the EPDCCH and the PDSCH from other cells or from the same cell. An option for estimating interference on the EPDCCH is to allocate orthogonal DMRS ports to different cells so that the estimation of interference may be more accurate. Alternatively, some new EPDCCH sets may be configured in neighbor cells that may have some overlap, and coordination may be conducted among cells in such EPDCCH sets to facilitate interference estimation and cancellation.

More specifically, the EPDCCH was introduced in Rel-11 to improve control channel capacity and to enable other performance enhancement schemes such as MIMO transmission and ICIC. Two kinds of transmissions are supported for the EPDCCH: localized EPDCCH transmission and distributed EPDCCH transmission. In localized EPDCCH transmission, a set of PRB pairs are allocated, and the EPDCCH may be transmitted in consecutive enhanced control channel elements (eCCEs) to benefit from beamforming gain. In distributed EPDCCH transmission, the EPDCCH is distributed over the spectrum to benefit from diversity gain. To avoid inter-cell interference, the EPDCCHs from neighboring cells may be allocated on different resources. However, in Rel-11, such coordination signaling among different cells is not defined. Without such coordination, there is a possibility that the EPDCCH from one cell may collide with the EPDCCH from another cell or with the PDSCH from another cell.

Since control channel performance may be important for overall system capacity, cancellation of interference on the EPDCCH may improve overall system performance. Several sets of embodiments are disclosed herein for EPDCCH interference estimation and cancellation. In the interest of brevity, unless otherwise noted, DMRS ports in these embodiments refer to DMRS used to receive the EPDCCH, such as LTE EPDCCH DMRS ports 107, 108, 109, and/or 110.

A first set of embodiments is directed toward blind interference estimation for the EPDCCH. When an EPDCCH has an aggregation level higher than 1, the EPDCCH may have one DMRS port associated with multiple eCCEs. In this case, it is possible that only the data part of the EPDCCH, but not the DMRS port, may be interfered with by a neighboring cell EPDCCH or PDSCH, as the neighboring cell may be synchronized to the serving cell, and orthogonal DMRS ports may be assigned to these resources. For example, the same DMRS scrambling sequence initialization parameter $n_{ID,i}^{EPDCCH}$ (hereinafter referred to as the EPDCCH virtual cell ID) may be used on the serving and neighboring cell EPDCCHs, but with different orthogonal covering codes (OCC) on the serving and interfering cells. Thus, the interference may be estimated from DMRS ports that are not used by an EPDCCH transmission. For example, if a UE receives an EPDCCH of aggregation level 2 and determines that DMRS port 107 is used for the UE's EPDCCH demodulation, the UE may try to detect on the other DMRS port 108 (or 8) to determine if the other port is being used to transmit another EPDCCH to UEs in the same cell or in a different cell or to transmit a PDSCH from a different cell. Such detection may be based on energy detected on a DMRS port to determine if the energy is above or below a threshold. If such detection indicates that such DMRS ports are used by another transmission, an estimate may be made of interference information, such as the channels from the interferer that transmits on these DMRS ports.

Two issues may need to be addressed in performing such an interference estimate. First, the DMRS ports used by the interferer may need to be orthogonal to the DMRS ports for the UE of interest in order to separate the channel of interference from the channel to the UE itself. Second, the DMRS sequences used by the interferer may need to be known by the UE of interest in order to estimate the interference channel.

The first issue may be generalized to consider both interference among EPDDCHs from different cells and interference among the EPDCCH and the PDSCH from different cells. If the DMRS ports used by an interferer and the DMRS ports used by the serving cell are transmitted on different sets of REs, orthogonality will be guaranteed among the DMRS ports used by the interferer and the DMRS ports used by the serving cell. For example, if the DMRS used by the serving cell is transmitted on ports {107,108} or {7,8} for either the EPDCCH or the PDSCH while the interfering cell uses DMRS ports {109,110} or {9,10} for either the EPDCCH or the PDSCH, orthogonality will be guaranteed. However, if the serving cell uses DMRS port 107 or 7 while the interfering cell uses DMRS port 108 or 8, as these two ports are transmitted on the same set of REs, the DMRS sequences used for each port may need to be the same in order to make the ports orthogonal to each other. In this case, some coordination may be needed if interference occurs from other cells.

In an embodiment, the same EPDCCH virtual cell ID is used among neighboring cells, or among cell-edge UEs in neighboring cells, to generate the same DMRS sequences for DMRS ports that are transmitted on the same set of REs, e.g., ports {107,108}. As the DMRS sequences are generated from lower frequency to higher frequency to cover the maximum system bandwidth of 110 PRBs, if the same cell ID is used in different cells, the same DMRS symbols will be transmitted on the same REs in the same PRBs from different cells. In this way, the orthogonality between DMRS ports 107 and 108 may be maintained when those ports are transmitted from different cells. The maintenance of orthogonality may assume that the arrival timings of the signals from different cells, i.e., the serving cell and the neighbor cells, to the UE are about the same, e.g., within the cyclic prefix of an OFDM symbol. Such an assumption may be held if the serving cell and the interfering cells all have a similar coverage area, such as the case of a plurality of small cells. Such an EPDCCH virtual cell ID may be exchanged among cells and signaled to the UE in the DMRS configuration for EPDCCH transmission. In another example, if the EPDCCH in the serving cell uses distributed transmission with DMRS ports {107,109}, then the interfering cell may be configured to use DMRS ports {108,110} or {8,10} for the interfering cell's EPDCCH transmission or PDSCH transmission, respectively. Similarly, a cell ID, a scrambling ID, and an EPDCCH virtual cell ID may be configured to maintain orthogonality among these ports.

To address the second issue, the UE of interest may need to know the IDs used to generate DMRS sequences for the interference. In an embodiment, IDs used to generate DMRS sequences for each cell are exchanged among those cells that may interfere with each other, and the IDs are signaled to the UEs. For example, a list of interfering cell IDs, scrambling IDs, and EPDCCH virtual cell IDs may be signaled to a UE semi-statically. Alternatively, one EPDCCH virtual cell ID may be used to generate DMRS sequences for the UEs at the cell edge in each cell, and such a configuration may be signaled to the UEs through higher layer signaling. It may be noted that a cell ID, a scrambling ID, and an EPDCCH virtual cell ID may be used to generate DMRS sequences for the EPDCCH and the PDSCH, as interference may come from both. The UE may then have knowledge of possible DMRS sequences from the interference and estimate the channels for interference cancellation.

In an embodiment, a serving eNB does not transmit on REs reserved for interference measurement for the EPDCCH. In such an embodiment, DMRSs corresponding to the EPDCCH are allocated to the EPDCCH and mapped to REs as in LTE Rel-11. However, as they are reserved for interference measurement, REs occupied by DMRSs not corresponding to the EPDCCH are not occupied by the EPDCCH as they would typically be. The EPDCCH may be punctured, where the EPDCCH is mapped to REs as in Rel-11 and then the reserved REs are set to zero power, that is, not transmitted upon. Therefore, the EPDCCH's forward error correction encoded bits that map to the reserved REs are not transmitted. Alternatively, the EPDCCH may be rate matched assuming that the reserved REs are not available for EPDCCH transmission, in which case no REs containing the EPDCCH's forward error correction encoded bits are set to zero power. Such an approach avoids collision between the EPDCCH and the DMRS transmitted on interfering cells.

In a version of the embodiment specific to localized EPDCCH, the reserved REs are REs corresponding to DMRS transmission on either DMRS ports {107,108} or {109,110}. This use of the DMRS ports for the reserved UEs for localized EPDCCH may have benefits. Localized EPDCCH is demodulated using one pair of DMRS ports ({107, 108} or {109,110}), and so power on the REs from the unused pair of DMRS ports can be set to zero during transmission without affecting DMRS ports associated with the EPDCCH. Furthermore, using existing DMRS ports for the reserved REs is compatible with existing receiver behaviors and physical channel structures.

In a more general embodiment, the reserved REs for interference may correspond to those typically used by the EPDCCH. In this case, the REs occupied by one or more DMRSs should not be used as the reserved REs, since the DMRSs do not occupy REs used by the EPDCCH. If CRSs or CSI-RSs are transmitted, it may also be desirable to exclude REs occupied by CRSs or CSI-RSs from the reserved REs. Furthermore, a sufficient number of REs should be used to allow adequate interference measurement accuracy of time-varying interference, which may require that the REs are present in each subframe in which an EPDCCH is transmitted to the UE. The reserved REs therefore may be present in each subframe when an EPDCCH is transmitted to the UE, may be those that occupy a plurality of resource elements in a resource block containing the EPDCCH, may be left blank or transmitted with zero power in the serving cell, and may comprise at least those which are not occupied by REs used for DMRS on any DMRS port.

While the EPDCCH can be transmitted with or without reserved interference measurement REs, it may be necessary for the UE to know if the reserved REs are present or not, since EPDCCH cannot occupy the reserved REs. Furthermore, UEs that are not capable of interference mitigation may not be able to use the reserved REs to improve EPDCCH reception. Therefore, in an embodiment, a UE that identifies itself as capable of EPDCCH interference mitigation is configured to receive an EPDCCH with reserved interference measurement REs.

Similarly to the case of PDSCH interference estimation or cancellation, coordination on orthogonal DMRS port assignments among cells may be accomplished through a backhaul link. A difference between signaling assigned DMRS ports to the UE for PDSCH transmission and for EPDCCH transmission is that a DMRS assignment for the PDSCH may be signaled to the UE dynamically, using a downlink grant for example, while for an EPDCCH transmission, the DMRS assignment may need to be configured semi-statically using higher layer signaling, such as RRC signaling.

As described above, the UE may blindly detect interference on DMRS ports that the serving cell does not use and estimate the channel of the DMRS ports based on some knowledge of the DMRS sequences of the DMRS ports. These solutions may not require additional coordination and signaling among cells other than some knowledge of the cell IDs used to generate such DMRS sequences from the interference. However, several remaining issues that may impact the performance of the interference estimation and cancellation may need to be considered.

A first issue is a potential lack of knowledge about EPDCCH interference resources. Even though a UE may estimate the interference channels, the UE may not know the exact resources that are used to transmit an interfering EPDCCH. This lack of knowledge may occur because an EPDCCH may be transmitted on multiple eCCEs, and the EPDCCH may use only one DMRS port. For example, an EPDCCH of aggregation level 2 (AL=2) may be transmitted using eCCEs #1 and #2 in a PRB pair, and DMRS port 107 may be used to transmit a reference signal. Alternatively, an EPDCCH of AL=4 may be transmitted on all four eCCEs in a PRB pair, and DMRS port 108 may be used for reference signal transmission. As such information is not available from the interferer to the UE of interest, it may be difficult for the UE to determine where such interference may collide with the UE's own signal and thereby impact the UE's interference cancellation performance. However, partial interference cancellation may still be possible. For example, in the case of an EPDCCH of aggregation level 2 with DMRS port 107, a UE may estimate the interference channel on DMRS port 108 and perform interference cancellation on eCCE #2 by assuming aggregation level 1 for the interference EPDCCH. Alternatively, the UE may perform interference cancellation on both eCCE #1 and eCCE #2 by assuming aggregation level 2.

A second issue is a potential lack of knowledge regarding DMRS ports and interference. EPDCCHs that are transmitted on multiple eCCEs, e.g., aggregation level 4 or 8, may experience multiple interferences. For example, an EPDCCH of AL=4 and DMRS port 107 transmitted on all four eCCEs in a PRB pair may be interfered with by one, two, or three EPDCCHs, each associated with one of the DMRS ports {108,109,110}. These interfering EPDCCHs may have different aggregation levels. For example, in the case of two interfering EPDCCHs, each with aggregation level 2, one may be transmitted on eCCEs #1 and #2 and the other may be transmitted on eCCEs #3 and #4. The two interfering EPDCCHs may use DMRS ports 108 and 110, respectively, and the UE of interest may detect and estimate the interference channels from those two DMRS ports. However, the UE of interest may not know the aggregation level of the interfering EPDCCHs. That is, the UE may not know whether the interfering EPDCCH linked to DMRS port 108 is transmitted on eCCE #2 or on both eCCE #1 and eCCE #2. A similar situation may exist for the second interference EPDCCH. This lack of knowledge may cause difficulty in the UE conducting appropriate interference cancellation. As mentioned, however, partial interference cancellation may still be possible.

A third issue concerns the collision of DMRS ports. As mentioned above, if the DMRS ports used by the interferer are orthogonal to the DMRS port used by the UE of interest, it may be possible for the UE to estimate interference channels. However, when an interferer happens to use the same DMRS ports as those used by the UE of interest for the interferer's transmission (either EPDCCH or PDSCH), which is highly possible, the collision of DMRS ports may degrade the ability of the UE of interest to estimate that UE's own channel, as well as that UE's ability to estimate the channel of interference with which that UE is colliding. The impact of such a collision may be mitigated by using different DMRS sequences, generated from different EPDCCH virtual cell IDs, in different cells on the same DMRS ports. Another solution is to use different sets of REs to transmit DMRSs from different cells. For example, ports {107,108} may be assigned for one cell, and ports {109, 110} may be assigned for another cell, so that the ports are fully orthogonal. This solution may require more restriction on EPDCCH transmission and more coordination among cells.

A fourth issue concerns whether ICIC is used among different cells for the cells' EPDCCH transmissions. EPDCCHs from different cells may not collide, but the EPDCCHs may collide with PDSCHs from other cells. A collision with a PDSCH in another cell may facilitate interference estimation and cancellation because the PDSCH from the interferer may be transmitted in entire PRBs, thus making the interference more uniform. The UE receiving the EPDCCH may detect the interference on other DMRS ports that the UE assumes are not used and may estimate the interference with knowledge of the DMRS sequences from the interferer. Such information may be passed among cells and signaled to the UE. For example, a list of cell IDs of neighbor cells may be exchanged among cells and signaled to the UE. The UE may then blindly detect the interference with different DMRS sequence hypotheses and estimate the interference.

A fifth issue for decoding the EPDCCH concerns how to cancel intra-cell interference from other EPDCCHs in MU-MIMO transmission. Such cancellation may be difficult because the UE may not know the linkage between DMRS ports by another EPDCCH and eCCEs on which the EPD-CCH is transmitted. If the eNB schedules EPDCCHs with the same aggregation level on MU-MIMO transmissions from the same set of eCCEs resources, the intra-cell interference estimation and cancellation may be easier. For example, if a UE decodes its EPDCCH candidate on eCCEs #1 and #2 in a PRB and assumes port 107 for the demodulation, the UE may try to detect DMRS port 108 for potential interference. If such interference is detected, the UE may assume that the interfering EPDCCH is also transmitted on eCCEs #1 and #2 and may try to estimate the interfering channel on DMRS port 108 and cancel the interference.

In summary, the UE may conduct blind interference estimation or cancellation on DMRS ports for an EPDCCH with some knowledge of DMRS sequences from interference. The EPDCCH virtual cell IDs used to generate DMRS sequences among neighbor cells may be different or, in the case of a cell ID, may be the same and may be exchanged among cells and signaled to the UE.

Figure 13:
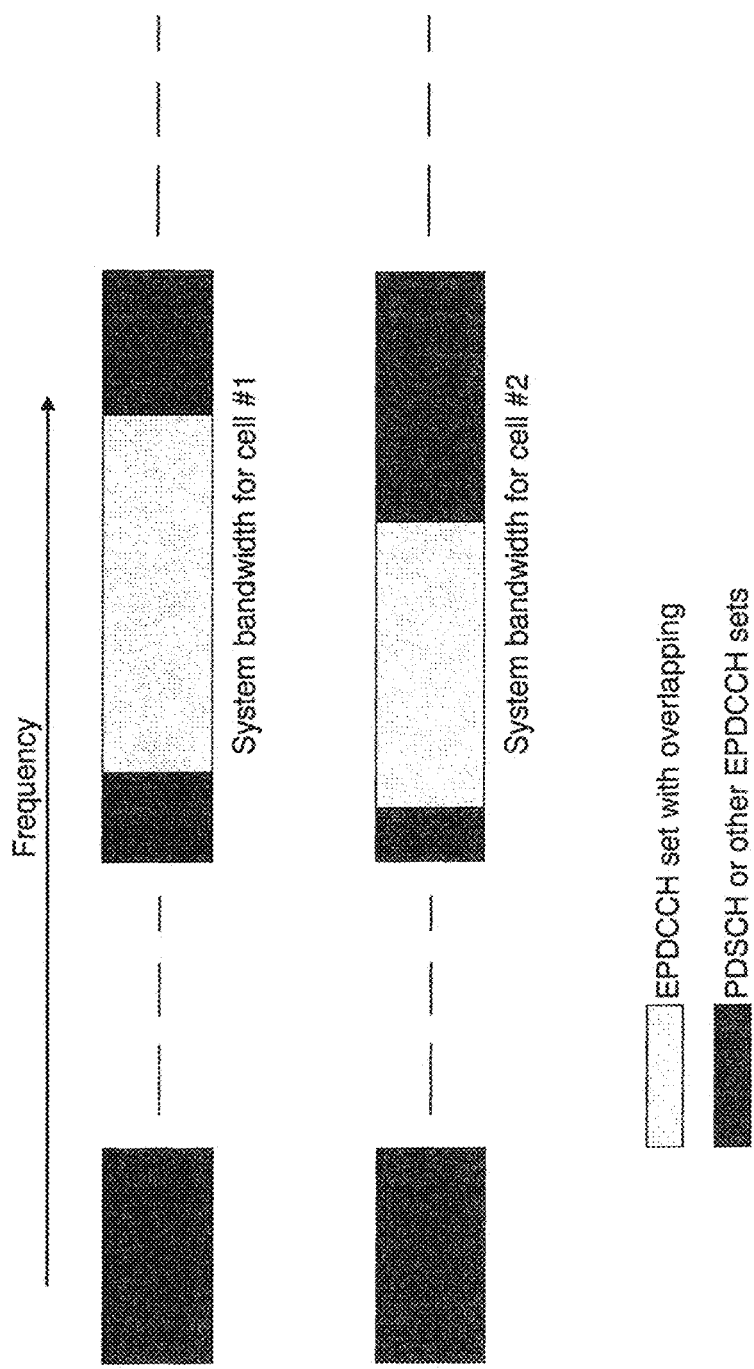
FIG. 13 is a diagram of overlapping EPDCCH sets for interference estimation and cancellation, according to an embodiment of the disclosure.

In an embodiment, issues mentioned above regarding interference estimation or cancellation for the EPDCCH may be addressed by allocating some special EPDCCH sets that overlap with each other. Such a scenario is shown in FIG. 13 as an example. Several aspects of this embodiment may need to be considered. First, such new EPDCCH sets configured in each cell may have overlapping resources (PRBs). Also, only UEs that are capable of interference estimation or cancellation may be configured for EPDCCH transmission on such sets. Such a restriction may reduce the impact to the legacy UEs. Also, such EPDCCH sets may be used only for localized EPDCCH transmission to facilitate interference estimation and cancellation, as interference cancellation for distributed EPDCCH transmission may not be as beneficial. In addition, orthogonal DMRS ports may be allocated to different EPDCCH sets from different cells. For example, DMRS ports {107,108} may be assigned to the EPDCCH set in one cell, and DMRS ports {109,110} may be assigned to the EPDCCH set in another cell. Further, the EPDCCH virtual cell ID used to generate DMRS sequences may be exchanged among cells, or an EPDCCH virtual cell ID may be used to generate DMRS sequences for DMRS ports in such EPDCCH sets. Also, the aggregation level for EPDCCHs transmitted on such EPDCCH sets may be aligned so that the EPDCCHs may have more uniform interference. For example, AL=2 or above may be specified to be used for EPDCCH transmission on such EPDCCH sets. In addition, the mapping of DMRS ports to eCCEs may be modified. For example, in the EPDCCH sets where DMRS ports {107,108} are assigned, port 107 may be mapped to eCCEs #1 and #2 in a PRB pair, while port 108 may be mapped to eCCEs #3 and #4. A similar port-to-eCCE mapping may be used for EPDCCH sets where DMRS ports {109,110} are assigned. That is, port 109 may map to eCCEs #1 and #2 while port 110 may map to eCCEs #3 and #4.

In summary, special EPDCCH sets may be configured to facilitate interference estimation or cancellation for EPD-CCHs among interfering cells. The DMRS ports, the DMRS sequences, and the aggregation level of the EPDCCH may be coordinated among interfering cells on such EPDCCH sets.

The PDSCH or the EPDCCH may be referred to generically as a physical downlink channel (PDCH). In another embodiment, a UE may receive information identifying a plurality of REs that are transmitted with zero power in a resource block containing a PDCH. The UE may also receive a first DMRS on a first DMRS port transmitted from a first cell. The UE may also receive the PDCH that is transmitted on the first DMRS port. The plurality of REs that are transmitted with zero power may occupy a subset of REs occupied by a second DMRS. The plurality of REs that are transmitted with zero power may be present in each sub-frame when the PDCH is transmitted to the UE. The plurality of REs that are transmitted with zero power may comprise those which cannot be occupied by any DMRS associated with the PDCH. The plurality of REs may comprise REs that are not used by the UE to receive at least one of a CRS, a CSI-RS, a PBCH, a PSS, or a SSS. Forward error correction bits of the PDCH that map to the plurality of REs may not be not transmitted. The PDCH may be rate matched assuming that the plurality of REs are not available for PDCH transmission. A capability indicator may be defined for a UE and may indicate at least one of a number of receive antennas the UE has; a number of transmission layers the UE can process, part of which are desired transmission layers and another part of which are interfering layers that the UE is capable of mitigating; or a capability for the UE to mitigate interference from a second cell that is different from the first cell and to support signaling that identifies the plurality of REs. A UE may receive signaling configuring the UE to receive the PDCH with the plurality of REs as reserved interference measurement REs. The UE may measure interference using the plurality of REs and may use the measurement of interference to estimate interference on the PDCH.

In an embodiment, a UE's capability for EPDCCH interference estimation or cancellation may be defined separately or together with the UE's capability for PDSCH interference estimation or cancellation. That is, the three sets of embodiments disclosed herein may be used in various combinations with one another.

The embodiments disclosed herein may improve the interference estimation and cancellation at the UE with some network coordination and assistance. If such mechanisms are implemented in LTE or another wireless system, advanced receivers in UEs that support such interference estimation and cancellation may improve individual UE performance as well as overall system throughput performance.

It was mentioned above that details would be provided herein regarding a UE in a small cell detecting whether a DMRS port not assigned to the UE carries a reference signal intended for another UE and regarding an interfered UE attempting to detect or estimate an interfering signal through an unassigned DMRS port. Such details are now provided.

As discussed above, a macro eNB or a coordinating small cell may semi-statically notify each small cell about the assigned layer that the small cell may use for data transmission. However, due to the latency of the backhaul link, such as the X2 interface, it may not be feasible to dynamically notify the users about the actual number of interfering antenna ports in each sub-frame. Therefore, to achieve a good estimate of interference, the UE may need to be able to determine how many interferers are actually present in each sub-frame and try to remove them, since a false assumption regarding the number of interferers may slightly degrade the performance of the receiver. In the following, an embodiment that addresses this issue is provided.

Assume there are at most eight DMRS ports, which are partitioned into two sets:
Set 1: DMRS ports 7, 8, 11, and 13
Set 2: DMRS ports 9, 10, 12, and 14
where each set of DMRS ports is multiplexed and transmitted on one set of REs in a code division multiplexing (CDM) manner. There may be four REs for each set and the four REs may occupy one subcarrier. In the following, an estimate is sought for the effective channel coefficients between a receiving antenna and the DMRS ports of one of the sets defined above.

If the number of transmitted ports is known at the UE, the UE may use the corresponding orthogonal covering code (OCC) sequences to decouple the multiplexed DMRS signals and determine the effective channel gains. However, if the UE does not know the number of transmitted DMRS ports, the following procedure may be used to determine the effective channel gains between each of the DMRS ports and a receive antenna.

Procedure:

Let $y_1$ denote the received signal at the j-th RE of the set of REs that carry a set of DMRS ports. Furthermore, h(i) represents the effective channel gain between the i-th DMRS port and the receive antenna when measured at the j-th RE of the set of REs.

It may first be assumed that all four DMRS ports of one set have been transmitted. In this case h(i) may be estimated as:

$$\hat{h}(i) = C_4^T(i) \begin{bmatrix} y_{11}/r_{i1} \\ y_{12}/r_{i2} \\ y_{13}/r_{i3} \\ y_{14}/r_{i4} \end{bmatrix}$$

where $r_{ij}$ denotes the transmitted signal of DMRS port i at the j-th RE of the set of REs, and $C_4(i)$ is the orthogonal covering code for one of the DMRS port sets, which may be one column (for port 7, it is the first column) of $C_4$, and $C_4$ is defined as:

$$C_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix}.$$

Next, a norm of the estimated channel response, $\|\hat{h}(i)\|^2$ is computed for each i. If all of the norms are larger than a threshold, it may be decided that all DMRS ports have been transmitted. Otherwise, if a norm of the estimated channel response is less than the threshold, it may be concluded that the DMRS port used to determine the norm has not been transmitted.

Alternatively, it may not be necessary to decide whether or not an interfering port is transmitted. If one DMRS port is not transmitted, the estimated channel gain h(i) may have a small norm. With proper treatment for the noise term in the channel estimation, the untransmitted DMRS port may not have a significant impact on the interference plus noise covariance matrix estimation when a linear interference suppression receiver is used.

Figure 14:
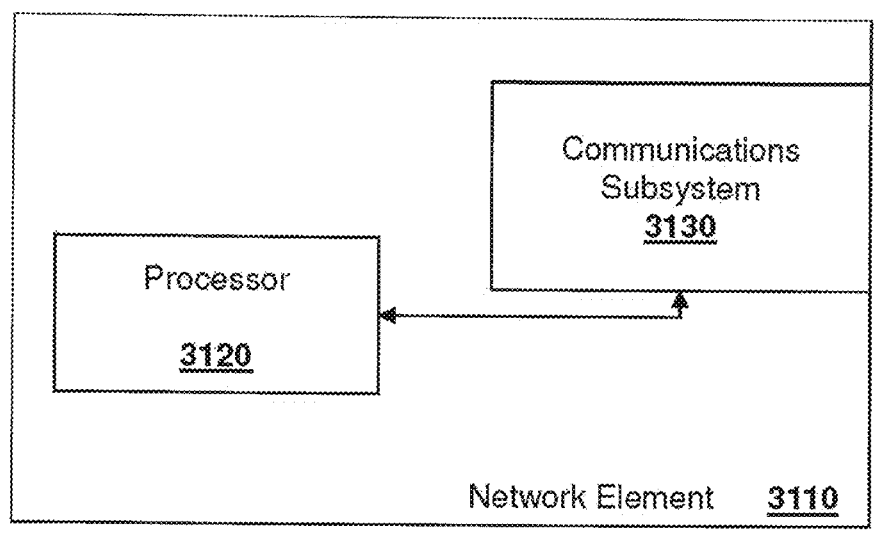
FIG. 14 is a simplified block diagram of an exemplary network element according to one embodiment.

The above may be implemented by a network element. A simplified network element is shown with regard to FIG. 14. In the figure, network element 3110 includes a processor 3120 and a communications subsystem 3130, where the processor 3120 and communications subsystem 3130 cooperate to perform the methods described above.

Figure 15:
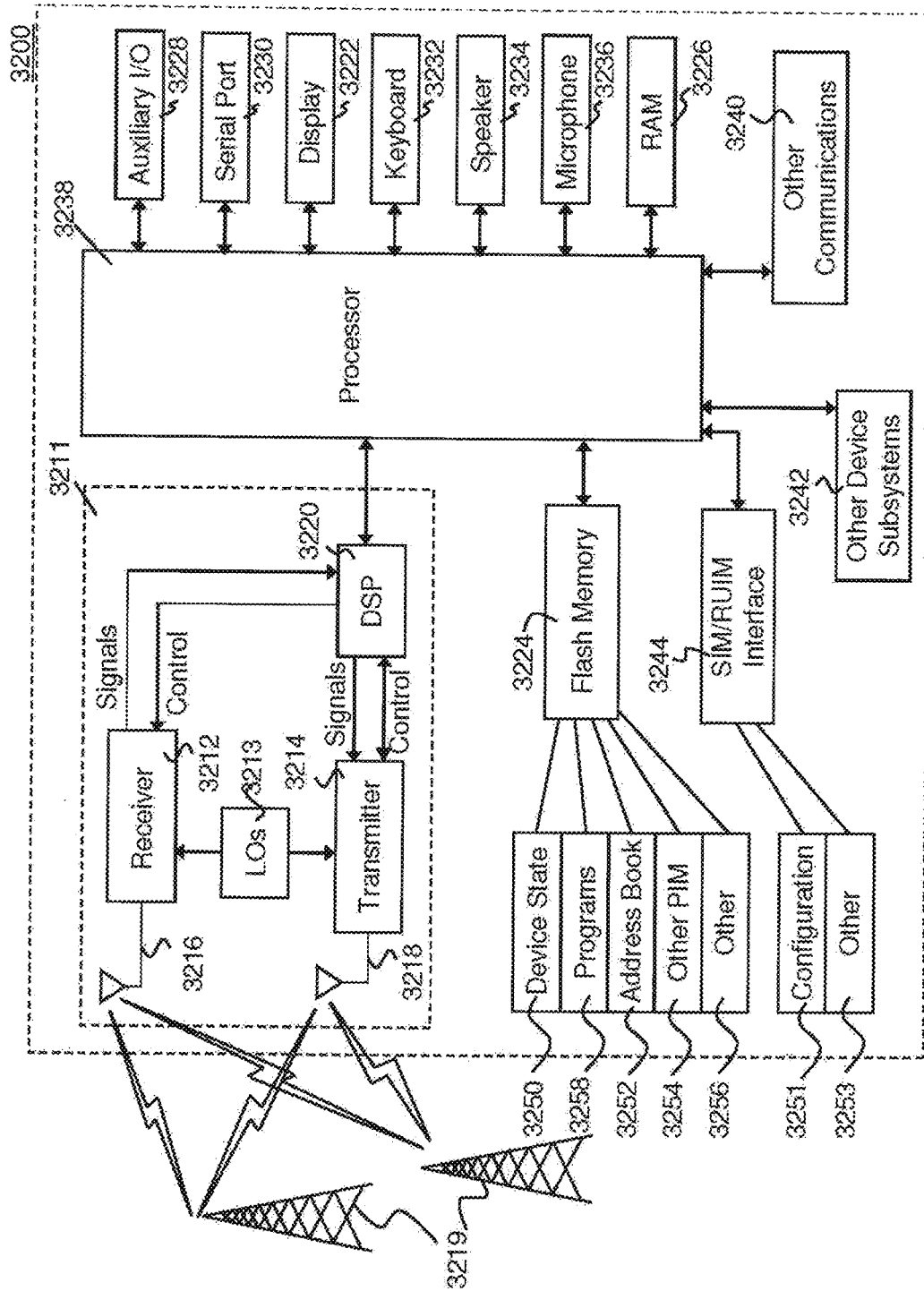
FIG. 15 is a block diagram with an example user equipment capable of being used with the systems and methods in the embodiments described herein.

Further, the above may be implemented by a UE. One exemplary device is described below with regard to FIG. 15. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in the figure, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, microphone 3234, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 16:
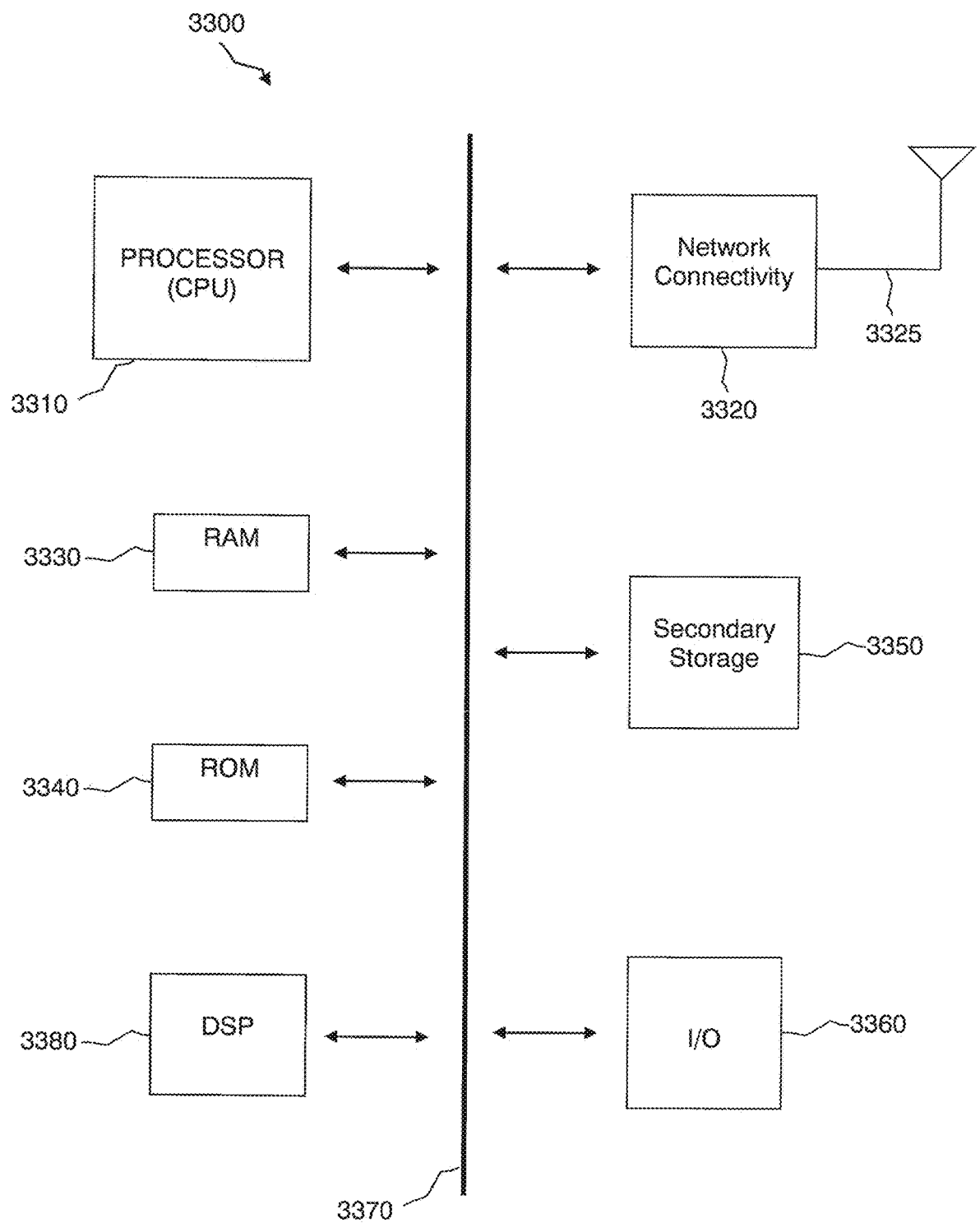
FIG. 16 illustrates a processor and related components suitable for implementing the several embodiments of the present disclosure.

The UE and other components described above might include a processing component that is capable of executing instructions related to the actions described above. FIG. 16 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for receiving a PDCH is provided. The method comprises: receiving, by a UE, information identifying a plurality of resource elements that are transmitted with zero power in a resource block containing the PDCH; receiving, by the UE, a first DMRS on a first DMRS port transmitted from a first cell; and receiving, by the UE, the PDCH that is transmitted on the first DMRS port.

In another embodiment, a method for transmitting a PDCH is provided. The method comprises: transmitting, by a network element, information identifying a plurality of resource elements that are transmitted with zero power in a resource block containing the PDCH; transmitting, by the network element, a first DMRS on a first DMRS port transmitted from a first cell; and transmitting, by the network element, the PDCH on the first DMRS port.

In another embodiment, a UE is provided. The UE comprises a processor configured such that the UE receives information identifying a plurality of resource elements that are transmitted with zero power in a resource block containing a PDCH, further configured such that the UE receives a first DMRS on a first DMRS port transmitted from a first cell, and further configured such that the UE receives the PDCH that is transmitted on the first DMRS port.

In another embodiment, a method for communication in a wireless communications network is provided. The method comprises: determining, by a coordinating element, a configuration of REs to be used by a first network element in a first cell for transmitting a first ZP CSI-RS and by a second network element in a second cell for transmitting a second ZP CSI-RS or a non-zero-power CSI-RS; and transmitting, by the first network element, the first ZP CSI-RS in at least one RE in which the second network element does not transmit either of the second ZP CSI-RS or the non-zero-power CSI-RS. The second network element may transmit a PDSCH in the at least one RE in which the first ZP CSI-RS is transmitted. The coordinating element may be a third network element in a third cell, and the first cell and the second cell may be within the coverage area of the third cell. The coordinating element may be a third network element in a third cell, and the first cell, the second cell, and the third cell may not be within the coverage area of any other cell. The coordinating element may be at least one of the first network element or the second network element, and the first network element and the second network element may not be within the coverage area of a third cell, and the first network element and the second network element may determine the configuration of the REs by transmitting to one another messages conveying respective configurations of REs. At least one of the first ZP CSI-RS and the second ZP CSI-RS may be transmitted over less than an entire transmission band, and information regarding a sub-band over which the at least one of the first ZP CSI-RS and the second ZP CSI-RS is transmitted may be indicated by at least one of: a ZP CSI-RS configuration indicator; or a predefined sub-band configuration. The first network element may transmit information indicating that the first ZP CSI-RS is usable for interference estimation. The configuration of REs may be updated by at least one of: a periodic update; or an update based on a change occurring in the wireless communications network.

In another embodiment, a coordinating element in a wireless communications network is provided. The coordinating element comprises a processor configured such that the coordinating element determines a configuration of REs to be used by a first network element in a first cell for transmitting a first ZP CSI-RS and by a second network element in a second cell for transmitting a second ZP CSI-RS or a non-zero-power CSI-RS. The first network element may transmit the first ZP CSI-RS in at least one RE in which the second network element does not transmit either of the second ZP CSI-RS or the non-zero-power CSI-RS. The second network element may transmit a PDSCH in the at least one RE in which the first ZP CSI-RS is transmitted. The coordinating element may be a third network element in a third cell, and the first cell and the second cell may be within the coverage area of the third cell.

The coordinating element may be a third network element in a third cell, and the first cell, the second cell, and the third cell may not be within the coverage area of any other cell. The coordinating element may be at least one of the first network element or the second network element, and the first network element and the second network element may not be within the coverage area of a third cell, and the first network element and the second network element may determine the configuration of the REs by transmitting to one another messages conveying respective configurations of REs. At least one of the first ZP CSI-RS and the second ZP CSI-RS may be transmitted over less than an entire transmission band, and information regarding a sub-band over which the at least one of the first ZP CSI-RS and the second ZP CSI-RS is transmitted may be indicated by at least one of: a ZP CSI-RS configuration indicator; or a predefined sub-band configuration. The first network element may transmit information indicating that the first ZP CSI-RS is usable for interference estimation. The configuration of REs may be updated by at least one of: a periodic update; or an update based on a change occurring in the wireless communications network.

In another embodiment, a method for communication in a wireless communications network is provided. The method comprises: receiving, by a UE, at least one ZP CSI-RS on a set of REs; receiving, by the UE, information indicating that a signal received on the set of REs is usable for interference estimation; and using, by the UE, the signal received on the set of REs to estimate interference on a PDSCH transmitted on a resource block containing the set of REs. The UE may receive at least one of the first ZP CSI-RS and the second ZP CSI-RS over less than an entire transmission band, and information regarding a sub-band over which the at least one of the first ZP CSI-RS and the second ZP CSI-RS is transmitted may be indicated to the UE by at least one of: a ZP CSI-RS configuration indicator; or a predefined sub-band configuration. The UE may receive an update of the configuration of REs by at least one of: a periodic update; or an update based on a change occurring in the wireless communications network.

The following are incorporated herein by reference for all purposes: 3GPP Technical Specification (TS) 36.211, 3GPP TS 36.213, 3GPP TS 36.300, 3GPP Technical Report (TR) 36.819, and 3GPP TR 36.829.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for estimating interference, the method comprising:
    receiving, by a user equipment (UE), an enhanced physical downlink control channel (EPDCCH) from a first network node, wherein physical resource block (PRB) resources of the EPDCCH overlap PRB resources of a second network node;
    receiving an indication of a demodulation reference signal (DMRS) port associated with the EPDCCH; and
    estimating the interference according to the EPDCCH and the DMRS port,
    wherein the DMRS port is orthogonal to a second DMRS port associated with a second EPDCCH of the second network node, and wherein orthogonality between the DMRS port and the second DMRS port is maintained by using an EPDCCH Identifier (ID).

2. The method of claim 1, wherein the DMRS port is allocated to the EPDCCH.

3. The method of claim 2, wherein orthogonality between the DMRS port and the second DMRS port is maintained by using at least one of a same cell identifier (ID) or a same scrambling ID to initialize pseudo-random sequences for DMRSs corresponding to the DMRS port and the second DMRS port.

4. The method of claim 1, wherein at least one of the DMRS port, a DMRS sequence, and an aggregation level of the EPDCCH is coordinated between the first network node and the second network node to enable estimating the interference according to the EPDCCH and the DMRS port.

5. The method of claim 1, further comprising receiving one or more virtual cell identifiers (IDs) used to generate DMRS sequences for the DMRS port associated with the EPDCCH.

6. The method of claim 1, wherein an aggregation level of the EPDCCH is aligned with an aggregation level of an EPDCCH of the second network node such that the EPDCCH of the first network node and the EPDCCH of the second network node have uniform experience.

7. The method of claim 1, further comprising determining, by the UE, whether a second DMRS port is being used for a transmission involving a different UE, wherein the UE determines that the second DMRS port is being used for the transmission involving the different UE when an energy level present on the second DMRS port is above a threshold, wherein the interference is further estimated according to the energy level present on the second DMRS port, and wherein the second DMRS port is associated with an EPDCCH of the second network node.

8. The method of claim 1, wherein the UE is configured to receive the EPDCCH via a localized EPDCCH transmission in which the EPDCCH is transmitted to the UE in consecutive enhanced control channel elements (eCCEs).

9. A user equipment (UE) comprising:
a memory; and
a processor coupled to the memory, the processor configured to:
receive an enhanced physical downlink control channel (EPDCCH) from a first network node, wherein physical resource block (PRB) resources of the EPDCCH overlap PRB resources of a second network node;
receive an indication of a demodulation reference signal (DMRS) port associated with the EPDCCH; and
estimate the interference according to the EPDCCH and the DMRS port,
wherein the DMRS port is orthogonal to a second DMRS port associated with a second EPDCCH of the second network node, and wherein orthogonality between the DMRS port and the second DMRS port is maintained by using an EPDCCH Identifier (ID).

10. The UE of claim 9, wherein the DMRS port is allocated to the EPDCCH.

11. The UE of claim 9, wherein at least one of the DMRS port, a DMRS sequence, and an aggregation level of the EPDCCH is coordinated between the first network node and the second network node to enable estimating the interference according to the EPDCCH and the DMRS port.

12. The UE of claim 9, wherein the processor is further configured to receive one or more virtual cell identifiers (IDs) used to generate DMRS sequences for the DMRS port associated with the EPDCCH.

13. The UE of claim 9, wherein an aggregation level of the EPDCCH is aligned with an aggregation level of an EPDCCH of the second network node such that the EPDCCH of the first network node and the EPDCCH of the second network node have uniform experience.

14. The UE of claim 9, wherein the processor is further configured to determine whether a second DMRS port is being used for a transmission involving a different UE, wherein the UE determines that the second DMRS port is being used for the transmission involving the different UE when an energy level present on the second DMRS port is above a threshold, wherein the interference is further estimated according to the energy level present on the second DMRS port, and wherein the second DMRS port is associated with an EPDCCH of the second network node.

15. A non-transitory storage medium comprising instructions that when executed by a processor cause the processor to:
receive an enhanced physical downlink control channel (EPDCCH) from a first network node, wherein physical resource block (PRB) resources of the EPDCCH overlap PRB resources of a second network node;
receive an indication of a demodulation reference signal (DMRS) port associated with the EPDCCH; and
estimate the interference according to the EPDCCH and the DMRS port,
wherein the DMRS port is orthogonal to a second DMRS port associated with a second EPDCCH of the second network node, and wherein orthogonality between the DMRS port and the second DMRS port is maintained by using an EPDCCH Identifier (ID).

16. The non-transitory storage medium of claim 15, wherein the DMRS port is allocated to the EPDCCH.

17. The non-transitory storage medium of claim 15, wherein at least one of the DMRS port, a DMRS sequence, and an aggregation level of the EPDCCH is coordinated between the first network node and the second network node to enable estimating the interference according to the EPDCCH and the DMRS port.

18. The non-transitory storage medium of claim 15, wherein the instructions further cause the processor to receive one or more virtual cell identifiers (IDs) used to generate DMRS sequences for the DMRS port associated with the EPDCCH.

19. The non-transitory storage medium of claim 15, wherein an aggregation level of the EPDCCH is aligned with an aggregation level of an EPDCCH of the second network node such that the EPDCCH of the first network node and the EPDCCH of the second network node have uniform experience.

20. The non-transitory storage medium of claim 15, wherein the instructions further cause the processor to determine whether a second DMRS port is being used for a transmission involving a different UE, wherein the UE determines that the second DMRS port is being used for the transmission involving the different UE when an energy level present on the second DMRS port is above a threshold, wherein the interference is further estimated according to the energy level present on the second DMRS port, and wherein the second DMRS port is associated with an EPDCCH of the second network node.

* * * * *